United States Patent
Ke et al.

(10) Patent No.: US 11,558,789 B2
(45) Date of Patent: Jan. 17, 2023

(54) METHOD FOR CONTROLLING WIRELESS LOCAL AREA NETWORK AGGREGATION AND ASSOCIATED EQUIPMENT

(71) Applicant: Samsung Electronics Co., Ltd., Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/090,556

(22) PCT Filed: Mar. 31, 2017

(86) PCT No.: PCT/KR2017/003552
§ 371 (c)(1),
(2) Date: Oct. 1, 2018

(87) PCT Pub. No.: WO2017/171470
PCT Pub. Date: Oct. 5, 2017

(65) Prior Publication Data
US 2019/0116527 A1    Apr. 18, 2019

(30) Foreign Application Priority Data

Apr. 1, 2016  (CN) .......................... 201610204757.1
Sep. 30, 2016  (CN) .......................... 201610875793.0

(51) Int. Cl.
*H04W 36/00*    (2009.01)
*H04W 76/16*    (2018.01)
(Continued)

(52) U.S. Cl.
CPC ... *H04W 36/0027* (2013.01); *H04W 36/0033* (2013.01); *H04W 36/0069* (2018.08);
(Continued)

(58) Field of Classification Search
CPC ......... H04W 36/0027; H04W 36/0033; H04W 36/0038; H04W 36/0069; H04W 36/14;
(Continued)

(56) References Cited

U.S. PATENT DOCUMENTS

2008/0261600 A1*  10/2008  Somasundaram ..........................
H04W 36/0079
455/436
2009/0061878 A1*  3/2009  Fischer .................. H04W 28/06
455/436
(Continued)

FOREIGN PATENT DOCUMENTS

CN         1292618 A       4/2001
CN       103220786 A       7/2013
(Continued)

OTHER PUBLICATIONS

4G Americas "LTE Aggregation & Unlicensed Spectrum" Nov. 2015 (Year: 2015).*
(Continued)

*Primary Examiner* — Stephen J Clawson

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present invention provides a method for controlling Wireless Local Area Network (WLAN) aggregation and an associated equipment. The method comprises the following steps of: acquiring, by a first radio access network node, WLAN information about a User Equipment (UE); and, controlling, by the first radio access network node, WLAN aggregation for the UE according to the acquired WLAN information. A second radio access network node decides whether to maintain a WT and/or whether to establish WLAN aggregation for the UE when the UE moves to a first radio access
(Continued)

network; and, the second radio access network node transmits information about whether to maintain the WT and/or indication information about whether to establish the WLAN aggregation for the UE. The WT receives UE context reference information transmitted by the first radio access network node; and, the WT indexes a UE context according to the received UE context reference information. With the present invention, the WLAN aggregation performance in a UE mobility scenario can be improved.

12 Claims, 14 Drawing Sheets

(51) Int. Cl.
  *H04W 36/38* (2009.01)
  *H04W 36/14* (2009.01)
  *H04W 84/12* (2009.01)
  *H04W 92/20* (2009.01)

(52) U.S. Cl.
  CPC .......... *H04W 36/38* (2013.01); *H04W 76/16* (2018.02); *H04W 36/0038* (2013.01); *H04W 36/14* (2013.01); *H04W 84/12* (2013.01); *H04W 92/20* (2013.01)

(58) Field of Classification Search
  CPC ..... H04W 36/38; H04W 76/16; H04W 84/12; H04W 92/20
  See application file for complete search history.

(56) References Cited

U.S. PATENT DOCUMENTS

| | | | |
|---|---|---|---|
| 2012/0100859 | A1 | 4/2012 | Han et al. |
| 2013/0242897 | A1 | 9/2013 | Meylan et al. |
| 2013/0315152 | A1 | 11/2013 | Ratasuk et al. |
| 2014/0204927 | A1 | 7/2014 | Horn et al. |
| 2014/0293970 | A1 | 10/2014 | Damnjanovic et al. |
| 2014/0369201 | A1 | 12/2014 | Gupta et al. |
| 2015/0109927 | A1* | 4/2015 | Ozturk .............. H04W 36/0027 370/235 |
| 2015/0350952 | A1 | 12/2015 | Ozturk et al. |
| 2016/0135120 | A1* | 5/2016 | Sirotkin ................ H04W 48/18 370/329 |
| 2017/0135151 | A1 | 5/2017 | Fujishiro et al. |
| 2018/0049063 | A1* | 2/2018 | Xu ......................... H04W 76/12 |
| 2019/0045560 | A1* | 2/2019 | Yao ................... H04W 36/0061 |
| 2019/0059048 | A1* | 2/2019 | Yeoh ..................... H04W 48/18 |

FOREIGN PATENT DOCUMENTS

| | | |
|---|---|---|
| CN | 104170308 A | 11/2014 |
| CN | 104601283 A | 5/2015 |
| WO | 2014-181181 A1 | 11/2014 |
| WO | 2016-013591 A1 | 1/2016 |
| WO | 2016-036296 A1 | 3/2016 |

OTHER PUBLICATIONS

Burbidge, Richard. "Liaison from 3GPP on LWA and LWIP" IEEE 802.11-16/351r1. Mar. 2016.*

ISA/KR, "International Search Report and Written Opinion of the International Searching Authority," International Application No. PCT/KR2017/003552, dated Aug. 2, 2017, 10 pages.

3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 291 pages.

European Patent Office, "Supplementary European Search Report," Application No. EP17775894.3, dated Feb. 14, 2019, 15 pages.

NEC, "Control plane aspects for LWA," R3-152607, 3GPP TSG RAN WG3 Meeting #90, Anaheim, USA, Nov. 16-20, 2015, 3 pages.

Nokia Networks, et al., "Mobility Set Handling for LWIP," R2-161496, 3GPP TSG-RAN WG2 Meeting #93, Malta, Feb. 15-19, 2016, 4 pages.

Nokia, et al., "Inter-eNB mobility with LWA active," R3-161982, 3GPP TSG-WG3 Meeting #93, Gothenburg, Sweden, Aug. 22-26, 2016, 3 pages.

Spreadtrum Communications, "UE Key refresh in LWA," R2-156457, 3GPP TSG-RAN WG2 Meeting #92, Anaheim, USA, Nov. 16-20, 2015, 3 pages.

Korean Intellectual Property Office (KIPO), Office Action dated Jan. 26, 2021 in connection with Korean Patent Application No. 10-2018-7028527, 8 pages.

Alcatel-Lucent, et al. "Extension of ANR to LWA for automatic Xw setup," 3GPP TSG-RAN WG3 #Adhoc NB-IOT, R3-160101, Budapest, Hungary, dated Jan. 20-22, 2016, 4 pages.

Chinese Intellectual Property Office (CNIPA), Office Action dated Apr. 1, 2021, in connection with Chinese Patent Application No. 201610875793.0, 17 pages.

China National Intellectual Property Administration, "The Second Office Action" dated Aug. 31, 2021, in connection to Chinese Patent Application No. 201610875793.0, 15 pages.

\* cited by examiner

METHOD FOR CONTROLLING WIRELESS LOCAL AREA NETWORK AGGREGATION AND ASSOCIATED EQUIPMENT

CROSS-REFERENCE TO RELATED APPLICATIONS

This application is a 371 National Stage of International Application No. PCT/KR2017/003552, filed on Mar. 31, 2017, which claims priority to Chinese Patent Application No. CN 201610204757.1, filed on Apr. 1, 2016 and Chinese Patent Application No. CN 201610875793.0 filed on Sep. 30, 2016, the disclosures of which are herein incorporated by reference in their entirety.

BACKGROUND

1. Field

The present invention relates to wireless communication technologies, and in particular to a method for controlling Wireless Local Area Network (WLAN) aggregation and an associated equipment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The modern mobile communications increasingly provide multi-media services of high-rate transmission to users. FIG. 1 is a system architecture diagram of system architecture evolution (SAE), in which:

user equipment (UE) 101 is a terminal device supporting a network protocol; evolved-universal terrestrial ratio access network (E-UTRAN) 102 is a wireless access network, including a base station (eNodeB/NodeB) which provides an interface for a UE for accessing to a wireless network; mobility management entity (MME) 103 is responsible for managing the mobility context, session context and security information of a UE; serving gateway (SGW) 104 mainly plays a role of providing a user panel, and the MME 103 and the SGW 104 may in a same physical entity; packet data gateway (PGW) 105 is responsible for charging, legal interception or the like, and may be in the same physical entity as the SGW 104; policy and charging rule functional entity (PCRF) 106 provides a quality of service (QoS) policy and charging rule; serving GPRS support node (SGSN) 108 is a network node device which provides routing for transmission of data in a universal mobile communication system (UMTS); home subscriber server (HSS) 109 is a home ownership subsystem of a UE, and responsible for protecting user information such as current location of a UE, address of a serving node, user security information, packet data context of a UE.

To improve the throughput of a UE, in the existing network architectures, a method for WLAN aggregation is provided. The WLAN aggregation is to establish a dual connection between an EUTRAN bearer and a WLAN bearer for a UE, and offload, by the WLAN, a part of or all of the data to be transmitted to the UE. The control plane of the UE is still established between the UE and a base station, and the WLAN merely offloads the user plane data. The base station controls the creation and deletion of aggregation on the WLAN side. By the WLAN aggregation method, the bandwidth of the WLAN is utilized to serve the UE, and the problem of poor WLAN service continuity is also solved.

However, in the prior art, under the control of the base station, the WLAN aggregation performance of the UE in a handover process of a radio access network node (i.e., in a UE mobility scenario) is low. Specifically, the mechanism for offloading data for a UE by a WLAN node still have many problems, for example, high signaling overhead, poor data continuity, and impact on the transmission rate of the data during the handover.

SUMMARY

The present invention provides a method for controlling WLAN aggregation and an associated equipment, in order to improve the WLAN aggregation performance in a UE mobility scenario.

The main technical solutions of the present invention are as follows.

A method for controlling Wireless Local Area Network (WLAN) aggregation is provided, comprising the following steps of:

acquiring, by a first radio access network node, WLAN information about a User Equipment (UE); and controlling, by the first radio access network node, WLAN aggregation for the UE according to the acquired WLAN information.

In a preferred embodiment, the acquiring, by a first radio access network node, WLAN information about a UE, comprises:

acquiring, by the first radio access network node, from at least one of the UE, a WLAN Termination (WT), a second radio access network node or a core network node, WLAN information about the UE.

In a preferred embodiment, the WLAN information about the UE at least comprises one or more of the following information:

information about a WT for WLAN aggregation for the UE, an identifier of the UE, configuration information about the WLAN aggregation for the UE, WLAN measurement report information, information about WLAN node candidates for the WLAN aggregation for the UE, WLAN state information of the UE, an identifier of a serving Public Land Mobile Network (PLMN), information about a WLAN node currently associated with the UE, WLAN measurement configuration information, WLAN capability of the UE, WT-created UE context indication information, and indication of update WLAN aggregation security information.

In a preferred embodiment, the information about a WT for WLAN aggregation for the UE comprises one or more of the following: an identifier of the WT, an address of the WT, and indication information about whether to maintain the WT;

and/or, the identifier of the UE contains one or more of the following: an identifier uniquely identifying a UE on an Xw interface in a radio access network node, an identifier uniquely identifying a UE on an Xw interface in a WT node;

and/or, the configuration information about the WLAN aggregation for the UE contains one or more of the following: a mobility set of the WLAN aggregation for the UE, security information for the WLAN aggregation, information about a bearer for the WLAN aggregation, and indication information about whether to change the mobility set of WLAN aggregations for the UE;

and/or, the WLAN capability of the UE contains one or more of the following: a frequency band or a carrier frequency of a WLAN supported by the UE;

and/or, the WLAN state information of the UE contains one or more of the following:

a WLAN identifier of a WLAN node, information about that WLAN connection is normal, and information about that WLAN connection is abnormal, information about WLAN connection success, information about successful association of the UE with the WLAN, an identifier of a WLAN node successfully associated with the UE, information about WLAN connection failure caused by a WLAN radio link issue, and information about WLAN connection failure caused by an internal reason of the UE, information about WLAN connection failure caused by the rejection from the WLAN, and information about WLAN connection failure due to a timeout failure;

and/or, the WLAN measurement report information contains one or more of the following: a WLAN identifier of a WLAN node, a WLAN frequency band or a WLAN carrier frequency supported by the WLAN node, the channel quality of the WLAN node, an available admission capacity, an available backhaul network downlink bandwidth, an available backhaul network uplink bandwidth, a channel utilization ratio, the number of accessible terminals, a WLAN measurement report event, and indication information of whether there is a WLAN node satisfying the WLAN aggregation conditions for the UE;

and/or, the information about WLAN node candidates for the WLAN aggregation for the UE contains one or more of the following: a WLAN identifier of a WLAN node, a WLAN frequency band or a WLAN carrier frequency supported by the WLAN node, the channel quality of the WLAN node, an available admission capacity, an available backhaul network downlink bandwidth, an available backhaul network uplink bandwidth, a channel utilization ratio, the number of accessible terminals, a WLAN measurement report event, indication information of whether there is a WLAN node satisfying the WLAN aggregation conditions of the UE, and indication information of the absence of WLAN node candidates for the WLAN aggregation for the UE.

In a preferred embodiment, the mobility set of the WLAN aggregation for the UE is an identifier of a WLAN node allocated to the UE to perform WLAN aggregation;

and/or, the security information for the WLAN aggregation contains one or more of the following: a current WT counter for the WLAN aggregation, a key about the UE of the WT, and a key about the UE of the radio access network node;

and/or, the information about a bearer for the WLAN aggregation comprises one or more of the following: a bearer identifier, a quality parameter, a particular radio resource configuration, and a mapping result of a 3GPP quality parameter of a UE bearer and a quality parameter of the WLAN.

In a preferred embodiment, the controlling WLAN aggregation for the UE comprises at least one of the following:

deciding whether to establish WLAN aggregation for the UE; determining a WT node for the WLAN aggregation for the UE; and, transmitting the updated WLAN aggregation security information.

In a preferred embodiment, the determining, by the first radio access network node, a WT node for the WLAN aggregation for the UE according to the acquired WLAN information specifically comprises:

determining, by the first radio access network node, to maintain a source WT node serving the UE when determining, according to the acquired WLAN information, that one or more of the following conditions are satisfied:

indication information of maintaining the WT is received;

indication information of maintaining the mobility set of the WLAN aggregation for the UE is received;

the mobility set of the WLAN aggregation is decided to be maintained;

the mobility set of the WLAN aggregation is changed, but the changed mobility set of the WLAN aggregation is still within a management range of a source WT;

the WLAN node currently associated with the UE satisfies the requirements of the WLAN aggregation;

there is no WLAN node candidate for the WLAN aggregation for the UE;

the received WLAN state information of the UE is the connection of the UE to the WLAN is normal; and the received WLAN state information of the UE is that the connection of the UE to the WLAN is abnormal, but the connection of the UE to the WLAN can be restored to a normal state by updating the mobility set of the WLAN aggregation for the UE.

In a preferred embodiment, when deciding to maintain the mobility set of the WLAN aggregation, the conditions for the decision specifically comprises at least one of the following: when the first radio access network node does not receive the WLAN measurement report information of the UE or the WLAN measurement report information of the UE is null; the information about WLAN node candidates for the WLAN aggregation for the UE is not received; and, when the information about WLAN node candidates for the WLAN aggregation for the UE is null;

and/or, when deciding to maintain the mobility set of the WLAN aggregation, the first radio access network node reuses more than one or more of the received configuration information about the WLAN aggregation for the UE to establish WLAN aggregation for the WT.

In a preferred embodiment, the first radio access network node decides not to establish WLAN aggregation for the UE when determining, according to the acquired WLAN information, that one or more of the following conditions are satisfied:

the indication information about whether to establish the WLAN aggregation for the UE is NO;

the information about abnormal WLAN connection is received;

the information about WLAN connection failure caused by a WLAN radio link issue is received;

the information about WLAN connection failure caused by an internal reason of the UE is received;

the information about WLAN connection failure caused by rejection from the WLAN is received;

the information about WLAN connection failure due to a timeout failure is received;

the received WLAN state information of the UE is the WLAN connection is abnormal; and the UE selects a WLAN node that is not selected by the first radio access network node, but this WLAN node does not satisfy the requirements of a WLAN node.

A radio access network node is provided, comprising:

a receiving module, configured to acquire WLAN information about a UE; and a determination module, configured to control WLAN aggregation for the UE according to the acquired WLAN information.

A method for controlling WLAN aggregation is provided, comprising the following steps of:

deciding, by a second radio access network node, whether to maintain a WT and/or whether to establish WLAN aggregation for a UE when the UE moves to a first radio access network; and transmitting, by the second radio access network node, information about whether to maintain the WT and/or indication information about whether to establish WLAN aggregation for the UE.

In a preferred embodiment, the transmitting, by the second radio access network node, information about whether to maintain the WT and/or indication information about whether to establish WLAN aggregation for the UE comprises:

transmitting, by the second radio access network node, information about whether to maintain the WT and/or indication information about whether to establish WLAN aggregation for the UE to at least one of a first radio access network node, the UE, the WT or a core network node.

In a preferred embodiment, the deciding, by a second radio access network node, whether to maintain a WT, comprises:

determining, by the second radio access network node, that a source WT node serving the UE is not to be changed when one or more of the following are satisfied:

a mobility set of the WLAN aggregation is decided not to be changed;

the mobility set of the WLAN aggregation is to be changed, but the changed mobility set of the WLAN aggregation is still within a management range of a source WT; and the WLAN state of the UE is normal.

In a preferred embodiment, the deciding, by the second radio access network node, that the mobility set of the WLAN aggregation is not required to be changed comprises: determining, by the second radio access network node, to maintain the mobility set of the WLAN aggregation for the UE when one or more of the following are satisfied:

an event of changing the mobility set of the WLAN aggregation for the UE does not occur; and the WLAN state of the UE is normal.

In a preferred embodiment, the not occurring an event of changing the mobility set of the WLAN aggregation for the UE comprises one or two of the following:

the WLAN measurement report information of the UE is not received; and the current mobility set of the WLAN aggregation is still within a validity period.

In a preferred embodiment, the information about maintaining the WT comprises one or more of the following information:

indication information of maintaining the WT, information about the WT for the WLAN aggregation for the UE, an identifier of the UE, configuration information about the WLAN aggregation for the UE, WLAN state information of the UE, an identifier of a serving PLMN, information about a WLAN node currently associated with the UE, WLAN measurement configuration information, and the WLAN capability of the UE;

and/or, the configuration information about the WLAN aggregation for the UE is configuration information about the WLAN aggregation for the UE, which is updated by the second radio access network node.

In a preferred embodiment, the method further comprises: deciding, by the second radio access network node, not to establish WLAN aggregation for the UE when one or more of the following conditions are satisfied:

the information about that WLAN connection is abnormal is received;

the information about WLAN connection failure caused by a WLAN radio link issue is received;

the information about WLAN connection failure caused by an internal reason of the UE is received;

the information about WLAN connection failure caused by rejection from the WLAN is received;

the information about WLAN connection failure due to a timeout failure is received;

the received WLAN state information of the UE is the WLAN connection is abnormal; and the UE selects a WLAN node that is not selected by the second radio access network node, but this WLAN node does not satisfy the requirements of a WLAN node.

In a preferred embodiment, the method further comprises: deciding, by the second radio access network node, to establish WLAN aggregation for the UE when one or more of the following conditions are satisfied:

the WLAN state of the UE is normal;

the WLAN state of the UE is abnormal but the abnormal WLAN state can be solved by updating the WLAN mobility set of the UE:

the WLAN state of the UE is abnormal, and the WLAN node currently associated with the UE satisfies the requirements of the WLAN aggregation;

the received WLAN state information of the UE is the connection of the UE to the WLAN is normal; and the received WLAN state information of the UE is that the connection of the UE to the WLAN is abnormal, but the connection of the UE to the WLAN can be restored to a normal state by updating the mobility set of the WLAN aggregation for the UE;

the existing mobility set of the WLAN aggregation for the UE is not to be updated; and the existing mobility set of the WLAN aggregation for the UE is to be updated and there is a WLAN node candidate for the WLAN aggregation for the UE.

A radio access network node is provided, comprising:

a module configured to decide whether to maintain a WT and/or whether to establish WLAN aggregation for a UE when the UE moves to a first radio access network; and a module configured to transmit information about whether to maintain the WT and/or indication information about whether to establish the WLAN aggregation for the UE.

A method for controlling WLAN aggregation is provided, comprising the following steps of:

receiving, by a WT, UE context reference information transmitted by a first radio access network node; and indexing, by the WT, a UE context according to the received UE context reference information.

In a preferred embodiment, the UE context reference information comprises: a UE identifier, and indication information of maintaining a UE context in the WT.

In a preferred embodiment, the indexing, by the WT, a UE context according to the received UE context reference information comprises:

indexing, by the WT, a UE context established in the WT according to the received UE identifier; and and/or, maintaining, by the WT, the indexed UE context according to the indication information of maintaining the UE context in the WT.

In a preferred embodiment, the method further comprises:

further transmitting configuration information about WLAN aggregation for the UE to a first radio access network node or the UE after the WT has indexed the UE context;

and/or, returning, by the WT, WT association confirmation indication information to the first radio access network node after the WT has indexed the UE context;

and/or, executing at least one of the following by the WT when the WT has not indexed the existing UE context: creating a UE context, returning the WT-created UE context indication information instead of the WT association confirmation indication information, and returning the indication of update WLAN aggregation security information.

A wireless local area network termination is provided, comprising:

a module configured to receive UE context reference information transmitted by a first radio access network node; and a module configured to index a UE context according to the received UE context reference information.

A method for controlling WLAN aggregation is provided, comprising the following steps of:

receiving, by a WT, WLAN aggregation release information; and executing, by the WT, a related operation of releasing WLAN aggregation according to the received WLAN aggregation release information.

Preferably, the WLAN aggregation release information can comprise at least one of the following: indication information of maintaining a UE context in the WT, indication information of maintaining a connection to a UE between the WT and a radio access network node, and indication information of stopping transmitting downlink data to a UE.

A method for controlling WLAN aggregation is provided, comprising the following steps of:

deciding, by a radio access network node, whether pre-defined conditions are satisfied; and transmitting, by the radio access network node, WLAN aggregation release information according to the satisfied pre-defined conditions.

Preferably, the pre-defined conditions comprise at least one of the following: receipt of indication information of maintaining a UE context in a WT, aware of handover start, receipt of handover request acknowledge, aware of handover completion, and receipt of a UE context release request.

It can be seen from the technical solutions that, in the present invention, WLAN information about a UE can be acquired by the interoperation of a radio access network and a WT, and the process of establishing WLAN aggregation is optimized in a UE mobility scenario, so that the signaling overhead is reduced, and the continuity of data and the high data transmission rate are maintained. Accordingly, the WLAN aggregation performance in the UE mobility scenario is enhanced, and the user experience is further improved.

Since the method for controlling WLAN aggregation provided by the present invention can improve the WLAN aggregation performance, the method provided by the present invention can also be called a method for enhancing WLAN aggregation mobility.

DETAILED DESCRIPTION

To improve the throughput of a UE, in the existing network architectures, a method for WLAN aggregation is provided. The WLAN aggregation is to establish a dual connection between an E-UTRAN bearer and a WLAN bearer for a UE, and offload, by the WLAN, a part of or all of the data to be transmitted to the UE. The control plane of the UE is still established between the UE and a base station, and the WLAN merely offloads the user plane data. The base station controls the creation and deletion of aggregation on the WLAN side. By the WLAN aggregation method, on one hand the bandwidth of the WLAN is utilized to serve the UE, and on the other hand the problem of poor WLAN service continuity is also solved.

The association of a UE with a WLAN node is to establish a connection between the UE and the WLAN node so that the two can exchange data. The re-association of a UE and a WLAN node is to switch the association of the UE with a WLAN node to another WLAN node. After the UE re-associating to another WLAN node, the continuity is still maintained. WLAN nodes available for re-association generally belong to a same Extended Service Area (ESS), an HESS or a same management range.

The WLAN aggregation mentioned herein can be aggregation of a radio access network and a WLAN in the 3GPP, for example, aggregation of an LTE and a WLAN, and aggregation of a radio access network and a WLAN in 5G radio access network.

Figure 1:
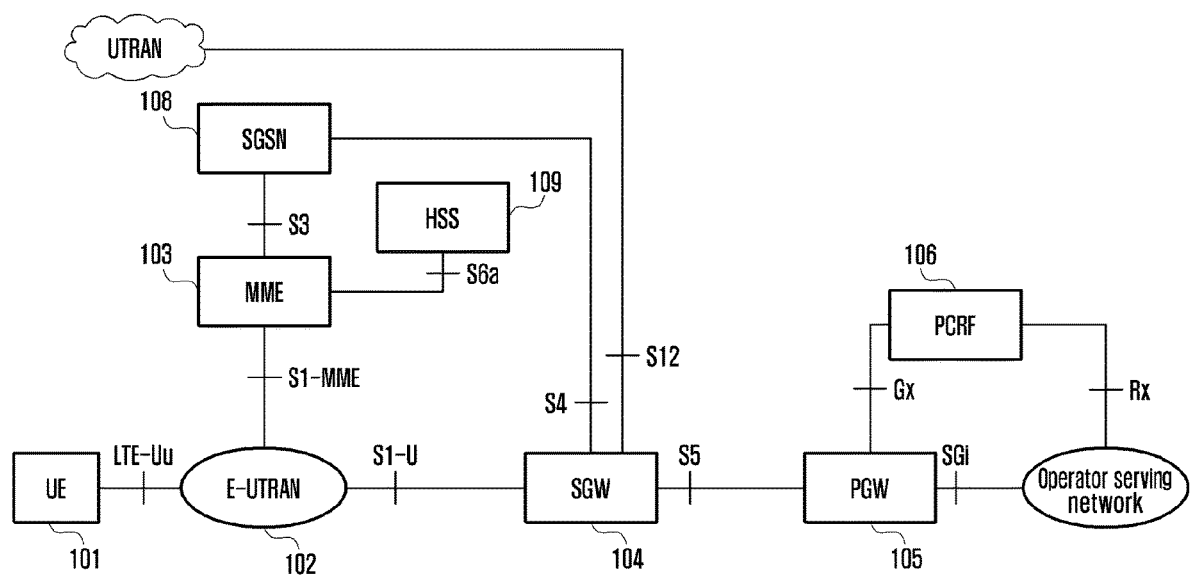
FIG. 1 is a schematic diagram of an EPS architecture according to the present invention.
Figure 2:
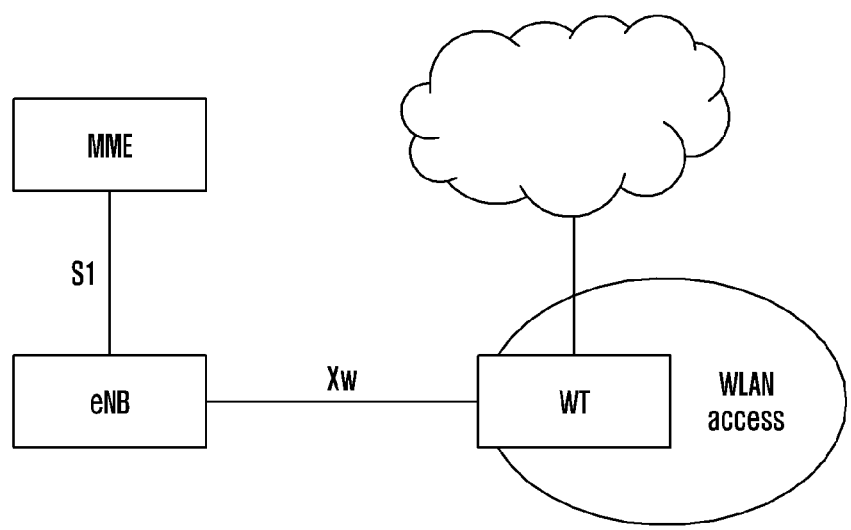
FIG. 2 is a schematic diagram of an interface between a base station and a WLAN according to the present invention.

As shown in FIG. 2, an interface between a base station and the WLAN side is an Xw interface, and the opposite side of the Xw interface for the base station is a WLAN Termination (WT). The WT can be regarded as a proxy on the WLAN side, and the impact on the WLAN side can be shielded by the WT. The WT can manage one or more WLAN entities, and each of the WLAN entities can be an AP, an AC, a BSS, an ESS, an HESS or other physical equipments. The WT can be an independent node, or the WT can also be combined with an AP, an AC or other WLAN entities.

When a UE is handed over between radio access network nodes, in accordance with the existing handover process, a source radio access network node releases the aggregation for the UE to the WT before the handover. After the UE is handed over to a target radio access network node, the target access network node reselects a WT to establish WLAN aggregation for the UE according to the requirements of WLAN aggregation.

The UE has no WLAN aggregation for the UE in the source radio access network node. When a handover event occurs, a WLAN measurement event satisfying WLAN aggregation conditions also occurs exactly. However, since there is no WLAN measurement information about the UE in the target radio access network node, when the UE is handed over to the target radio access network, the UE will not report WLAN measurement if the UE always stays in the measured WLAN node. The target radio access network node will consider that the UE has no WLAN node satisfying the WLAN aggregation. Thus, the UE loses an opportunity of establishing WLAN aggregation and an opportunity of improving the throughput.

There are still the following problems in the prior art.

If a target WT selected by the target radio access network node is a source WT released by the source radio access network node, with regard to the WT, the WT is released unnecessarily, and as a result, the signaling resources are wasted; while with regard to the UE, the transmission of data for the WLAN aggregation is interrupted, and as a result, the data rate of the UE is influenced and the user experience is influenced.

In the following various cases, the target access network node is very likely to still select the released source WT as a serving WT of the UE.

Case 1: The mobility set of the WLAN node currently accessed by the UE or the WLAN node configured for the WLAN aggregation for the UE is not to be changed.

Case 2: The mobility set of the WLAN node configured for the WLAN aggregation for the UE is required to be changed, but the changed mobility set of the WLAN node configured for the WLAN aggregation for the UE is still within the management range of the source WT.

At present, in order to support that the WT is not released, during the handover between radio access network nodes, there are still the following problems.

1) The target radio access network node is unable to decide whether the WLAN aggregation can be immediately established for the UE in the current WLAN state of the UE.

2) Even if it is determined that the WLAN aggregation can be established, the target radio access network node is unable to judge whether the WLAN node accessed by the UE is required to be changed and whether the changed WLAN node is still within the management range of the original WT.

3) If a WLAN measurement event may not occur when a handover event occurs, there is no WLAN measurement report. The source radio access network may not store the historical WLAN measurement reports before handover.

4) When a handover event occurs, the WLAN state may change. For example, the UE closes the WLAN or the connection of the UE to the WLAN fails.

5) If the target radio access network does not know the WLAN capability of the UE and the supported band, the target radio access network does not know how to select the mobility set of the WLAN node for the WLAN aggregation for the UE.

6) During the handover, when the target radio access network node receives a handover request from the source radio access network node, it is unable to acquire a UE context from the UE side, for example, the identifier of the UE on the WLAN side; and, when the UE accesses a WLAN node, the WT does not know whether the association is successful.

Case 3: During the handover, it is needed to update the security context between the UE and the base station, so the data transmission will be interrupted; and if it is able to continue to perform transmission between the UE and the WT, the throughput of the UE can be maintained during the handover. However, it is still unclear about how to support data transmission between the UE and the WT.

To make the objectives, technical solutions and advantages of the present invention clearer, the present invention will be further described below in details by embodiments with reference to the accompanying drawings.

Figure 3:
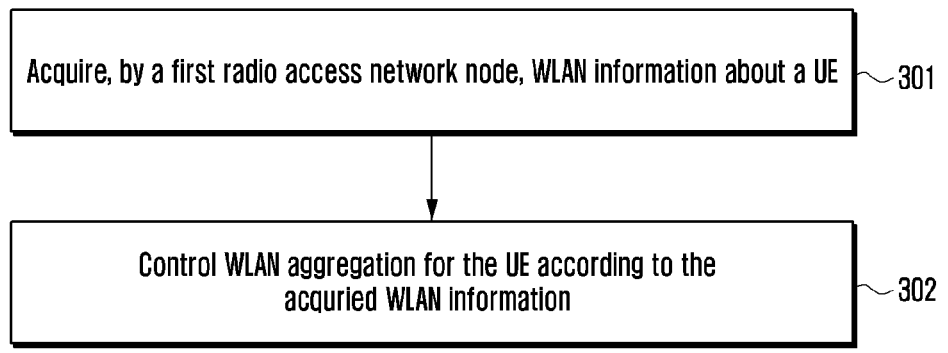
FIG. 3 is a schematic flowchart of a first method for enhancing WLAN aggregation mobility according to the present invention.

FIG. 3 is a schematic flowchart of a first method for enhancing WLAN aggregation mobility according to the present invention. This method comprises the following steps.

Step 301: By a first radio access network node, WLAN information about a UE is acquired.

In some implementations, the first radio access network node acquires, from the UE, a WT, a second radio access network or a core network node, WLAN information about the UE.

In a preferred implementation, the WLAN information about the UE at least comprises one or more of the following information:

information about a WT for WLAN aggregation for the UE, an identifier of the UE, configuration information about the WLAN aggregation for the UE, WLAN measurement report information, information about WLAN node candidates for the WLAN aggregation for the UE, WLAN state information of the UE, an identifier of a serving Public Land Mobile Network (PLMN), information about a WLAN node currently associated with the UE, WLAN measurement configuration information, WLAN capability of the UE, indication information about whether to create the WLAN aggregation for the UE, WT-created UE context indication information, and indication of update WLAN aggregation security information.

In a preferred implementation, the information about a WT for WLAN aggregation for the UE comprises one or more of the following information:

an identifier of the WT, an address of the WT, and indication information about whether to maintain the WT. In some implementations, the information about a WT for WLAN aggregation for the UE is used by the first radio access network node to associate a source WT. In other implementations, through the relationship between the WLAN node for WLAN aggregation currently associated with the UE and the WT, the first radio access network node can also associate a source WT. In a preferred implementation, the source WT is the WT currently establishing the WLAN aggregation for the UE.

In a preferred implementation, the UE identifier comprises one or more of the following:

an identifier uniquely identifying a UE on an Xw interface in a radio access network node (e.g., eNB UE XWAP ID), an identifier uniquely identifying a UE on an Xw interface in a WT node (e.g., WT UE XWAP ID), and an identifier uniquely identifying a UE in a WLAN (e.g., the WLAN MAC address of the UE).

In some implementations, the WLAN address of the UE is used by the WT to know whether the UE has successfully associated to a WLAN node under the WT. In some implementations, the WT UE XWAP ID is an identifier assigned to the UE by the WT when the second radio access network node and the WT establish WLAN aggregation for the UE. Through the identifier of the UE, it is able to know whether there is a UE context in the WT.

In a preferred implementation, the configuration information about the WLAN aggregation for the UE comprises one or more of the following: a mobility set of the WLAN aggregation for the UE (e.g., a set of WLAN nodes), security information for the WLAN aggregation, information about a bearer for the WLAN aggregation, and indication information about whether to change the mobility set of the WLAN aggregation for the UE.

In a preferred implementation, the mobility set of the WLAN aggregation for the UE refers to WLAN nodes configured for the UE for performing the WLAN aggregation, and it is unnecessary to inform the base station when the UE moves among these configured WLAN nodes.

In a preferred implementation, the mobility set of the WLAN aggregation for the UE at least comprises one or more of the following: a group of WLAN identifiers, a group of deleted WLAN identifier, and a group of added WLAN identifiers.

The WLAN identifier is an identifier of a WLAN node; and in some implementations, the WLAN identifier at least contains one of the following contents: an SSID, a BSSID and an HESSID.

In some implementations, the WLAN node refers to an AP, an AC, a WT, a BSS, an ESS, an HESS or other WLAN nodes or units.

In some implementations, when the first radio access network node receives the mobility set of the WLAN aggregation for the UE, it is indicated that the mobility set of the WLAN aggregation for the UE can be maintained or the mobility set of the WLAN aggregation for the UE is required not to be changed.

In some implementations, when the first radio access network node receives an indication of being not required to change the mobility set of the WLAN aggregation for the UE, the first radio access network node reuses the WLAN aggregation for the UE which is established when receiving the mobility set of the UE. In further implementations, when the first radio access network node receives an indication of being required to change the mobility set of the WLAN aggregation for the UE, the first radio access network node can select a mobility set of the WLAN aggregation for the UE according to the received WLAN measured report information or the received list of WLAN node candidates for the WLAN aggregation for the UE; and, if the selected mobility set of the WLAN aggregation is already not within the management range of the source WT, the second radio access network node is indicated to not reserve the UE context, and the second radio access network node releases the UE context in the source WT.

In a preferred implementation, the information about a bearer for the WLAN aggregation is information of a bearer offloaded to WLAN, and comprises one or more of the following:

a bearer identifier (e.g., an identifier of an ERAB and/or an identifier of a DRB), a quality parameter (e.g., QCI, GBR, MBR, ARP or more), a particular radio resource configuration, and a mapping result of a 3GPP quality parameter of a UE bearer and a quality parameter of the WLAN (e.g., access category or user priority).

In some implementations, the UE can bear uplink data transmission of a WLAN aggregation bearer decided by the mapped access category. Generally, different access categories have different back-off times during a resource collision.

In a preferred implementation, the security information for the WLAN aggregation contains one or more of the following: a current WT counter for the WLAN aggregation (e.g., lwa-WT-Counter), a key about the UE of the WT (e.g., S-$K_{WT}$), and a key about the UE of the radio access network node (e.g., $K_{eNB}$). In some implementations, the radio access network node decides a key (e.g., S-$K_{WT}$) for WT to encrypt and offload data, according to the $K_{eNB}$ and lwa-WT-Counter.

In a preferred implementation, the WLAN capability of the UE contains one or more of the following: a frequency band (e.g., band) or a carrier frequency (e.g., carrier) of a WLAN supported by the UE. In some implementations, the frequency band or carrier frequency of the WLAN is manifested as one or more of the following: an operating class, a country code and a channel number.

In a preferred implementation, the WLAN state information of the UE contains one or more of the following:

a WLAN identifier of a user's preferred WLAN node (the WLAN identifier is as described above and will not be repeated here), information about normal connection of the UE to the WLAN, and information about abnormal connection of the UE to the WLAN.

The information about normal WLAN connection can further contain one or more of the following: information about WLAN connection success, information about successful association of the UE with the WLAN, and an identifier of a WLAN node successfully associated with the UE.

The information about abnormal WLAN connection can further contain one or more of the following: information about WLAN connection failure caused by a WLAN radio link issue, information about WLAN connection failure caused by an internal reason of the UE (for example, the UE closes the WLAN, or selects another WLAN node due to the user's preference), information about WLAN connection failure caused by the rejection from the WLAN, and information about WLAN connection failure due to a timeout failure.

In some implementations, the WLAN state information can be WLAN state information latest reported by the UE, or historical WLAN state information.

In a preferred implementation, indication information about whether to establish the WLAN aggregation for the UE is used by the first radio access network node to decide whether the WLAN aggregation for the UE can be immediately established according to the received other WLAN information about the UE.

In a preferred implementation, the WLAN measurement report information comprises one or more of the following: a WLAN identifier (which is as described above and will not be repeated here) of a WLAN node, a WLAN frequency band or a WLAN carrier frequency supported by the WLAN node, the channel quality of the WLAN node (e.g., RSSI), an available admission capacity, an available backhaul network downlink bandwidth, an available backhaul network uplink bandwidth, a channel utilization ratio, the number of accessible terminals (e.g., stationCount), a WLAN measurement report event, and indication information about whether there is a WLAN node satisfying the WLAN aggregation conditions of the UE.

In a preferred implementation, the WLAN measurement report event contains one or more of the following: event 1 (there is a WLAN node superior to a threshold), event 2 (all WLAN nodes in the mobility set of the WLAN aggregation for the UE are inferior to the threshold and there is a WLAN node beyond the mobility set superior to the threshold), and event 3 (all WLAN nodes in the mobility set of the WLAN aggregation for the UE are inferior to the threshold). In some implementations, the threshold is a threshold condition for the WLAN aggregation for the UE.

In some implementations, the WLAN measurement report information is information about a WLAN node measured by the UE according to the WLAN measurement configuration.

In a preferred implementation, content about the information about WLAN node candidates for the WLAN aggregation for the UE contains one or more of the content the WLAN measurement report information and will not be repeated here. In some implementations, the information about WLAN node candidates for the WLAN aggregation for the UE is information about WLAN node candidates for the WLAN aggregation for the UE when the UE performs WLAN aggregation, or information about WLAN node candidates for the WLAN aggregation for the UE in the mobility set for the WLAN aggregation. A WLAN node candidate for the WLAN aggregation for the UE can be the best WLAN node measured in the WLAN frequency band or carrier frequency.

In some implementations, the second radio access network, the UE or the core network select the best WLAN node from the WLAN nodes, which are measured in the WLAN frequency band or carrier frequency by the UE according to the designed measurement. In some implementations, the best standard is achieved in a combination of one or more of the following conditions: the channel equality (e.g., RSSI), the available admission capacity, the available backhaul network downlink bandwidth, the available backhaul network uplink bandwidth, the channel utilization ratio, and the number of accessible terminals (e.g., stationCount).

In some implementations, the information about WLAN node candidates for the WLAN aggregation for the UE further contains indication information of the absence of WLAN node candidates for the WLAN aggregation for the UE, indicating that there is no WLAN node satisfying the WLAN aggregation conditions. In other implementations, when the first radio access network node receives the information about WLAN node candidates for the WLAN aggregation for the UE or the information about WLAN node candidates for the WLAN aggregation for the UE is not null, it is indicated that the mobility set of the WLAN aggregation for the UE is to be changed.

In a preferred implementation, the content of the information about a WLAN node currently associated with the UE contains one or more of the WLAN measurement report information and will not be repeated here. In some implementations, through the relationship between the WLAN node for WLAN aggregation currently associated with the UE and the WT, the first radio access network node can also associate to the source WT.

In a preferred implementation, the WLAN measurement configuration information comprises one or more of the following: a WLAN identifier of the measured WLAN node (which is as described above and will not be repeated here), and a measured WLAN frequency band or WLAN carrier frequency (which is as described above and will not be repeated here).

In a preferred implementation, the identifier of the serving PLMN is an identifier of a PLMN currently serving the UE. The PLMN or operator to which each WLAN node belongs may be different. In some implementations, only WLAN nodes in the serving PLMN of the UE can be configured to perform WLAN aggregation for the UE.

Step 302: WLAN aggregation for the UE is controlled according to the acquired WLAN information.

Specifically, the controlling WLAN aggregation for the UE comprises at least one of the following: deciding whether to establish WLAN aggregation for the UE; determining a WT node for the WLAN aggregation for the UE; and, transmitting the updated WLAN aggregation security information.

In some implementations, the first radio access network node decides whether to request the determined WT node to establish WLAN aggregation.

In a preferred implementation, the first radio access network node determines to maintain a source WT node serving the UE when one or more of the following conditions are satisfied. In some implementations, when it is determined to maintain the source WT node serving the UE, the first radio access network node requests the source WT node to establish WLAN aggregation.

1) Indication of maintaining the WT is received.
2) Indication of maintaining the mobility set of the WLAN aggregation for the UE is received.
3) The mobility set of the WLAN aggregation is decided to be maintained. In some implementations, the first radio access network node reuses one or more of the received configuration information about the WLAN aggregation for the UE to establish WLAN aggregation for the WT. In some implementations, the first radio access network node can decide to maintain the mobility set of the WLAN aggregation according to the following:

a) an event of the mobility set of the WLAN aggregation being inferior to a WLAN aggregation threshold is not received;

b) the WLAN measurement report information of the UE is not received or the WLAN measurement report information of the UE is null; and c) the information about WLAN node candidates for the WLAN aggregation for the UE is not received or the information about WLAN node candidates for the WLAN aggregation for the UE is null.

4) The mobility set of the WLAN aggregation is changed, but the changed mobility set of the WLAN aggregation is still within a management range of the source WT. In some implementations, according to the decided management relationship between the WLAN nodes in the mobility set of the aggregation for the UE and the WT, the first radio access network node determines a WT node serving the UE, so as to decide whether to change the WT node.

5) The WLAN node currently associated with the UE satisfies the requirements of WLAN aggregation.

6) There is no WLAN node candidate for the WLAN aggregation for the UE. The received WLAN state information of the UE is the connection of the UE to the WLAN is normal.

7) The received WLAN state information of the UE is that the connection of the UE to the WLAN is abnormal, but the connection of the UE to the WLAN can be restored to a normal state by updating the mobility set of the WLAN aggregation for the UE. For example, due to the user's preference, a WLAN node beyond the mobility set of the WLAN aggregation for the UE is selected, but the user's preferred WLAN node satisfies the requirements of WLAN aggregation.

In a preferred implementation, the first radio access network node establishes WLAN aggregation for the UE when the UE satisfies the conditions of establishing WLAN aggregation, for example, one or more of the following conditions.

1) There is a WLAN node satisfying the conditions for the WLAN aggregation for the UE, for example, one or more of the following:

a) the existing mobility set of the WLAN aggregation for the UE still satisfies the conditions for WLAN aggregation;

b) the WLAN measurement report information of the UE is received, and a WLAN node satisfying the conditions for WLAN aggregation is contained therein;

c) the information about WLAN node candidates for the WLAN aggregation for the UE is received;

d) the WLAN node currently associated with the UE satisfies the requirements of WLAN aggregation; and e) The user's preferred WLAN node satisfies the requirements of WLAN aggregation.

2) The state of the UE and the state of the WLAN is normal. For example, the received WLAN state information of the UE is the connection of the UE to the WLAN is normal.

3) The state of the UE and the state of the WLAN is abnormal, but the WLAN state of the UE can be restored to the WLAN normal state of the UE by updating the WLAN mobility set of the UE (the contents are as described in the step 301).

In a preferred implementation, the first radio access network node decides not to establish WLAN aggregation for the UE when the UE does not satisfy the conditions of establishing WLAN aggregation, for example, one or more of the following conditions. In some implementations, if the first radio access network finds that the UE does not satisfy the conditions of establishing WLAN aggregation upon receiving a handover request, the first radio access network does not establish WLAN aggregation for the UE during the handover. Not until the UE satisfies the conditions of establishing WLAN aggregation again, the first radio access network then decides whether to establish WLAN aggregation for the UE as desired.

1) The indication information about whether to establish the WLAN aggregation for the UE is NO.

2) There is no WLAN node satisfying the conditions for WLAN aggregation for the UE.

3) The WLAN state of the UE is abnormal, for example, one or more of the following:

a) the information about abnormal WLAN connection is received;

b) the information about WLAN connection failure caused by a WLAN radio link issue is received;

c) the information about WLAN connection failure caused by an internal reason of the UE is received (for example, the UE closes the WLAN or selects another WLAN node due to the user's preference);

d) the information about WLAN connection failure caused by rejection from the WLAN is received;

e) the information about WLAN connection failure due to a timeout failure is received;

f) the received WLAN state information of the UE is the WLAN connection is abnormal; and g) the UE selects a WLAN node not belonging to the mobility set of the WLAN aggregation for the UE (for example, selects a WLAN node not belonging to the mobility set of the WLAN aggregation for the UE due to the user's preference), but the user's preferred WLAN node does not satisfy the requirements of WLAN aggregation.

In the step 302, the mobility set of the WLAN aggregation for the UE, the indication information of the absence of WLAN node candidates for the WLAN aggregation for the UE, the WLAN measurement report information, the information about WLAN node candidates for the WLAN aggregation for the UE, the WLAN state information of the UE and the indication information about whether to establish WLAN aggregation for the UE are all as described in the step 301 and will not be repeated here.

In some implementations, the first radio access network node transmits the updated WLAN aggregation security information when the acquired WLAN information about the UE comprises at least one of the following: the WT-created UE context indication information, and the indication of update WLAN aggregation security information. The first radio access network node can transmit updated WLAN aggregation security information to at least one of the following: a second radio access network node, the UE and a WT.

Corresponding to the method shown in FIG. 3, the present invention further discloses a radio access network node, comprising:

a receiving module, configured to acquire WLAN information about a UE; and a determination module, configured to control WLAN aggregation for the UE according to the acquired WLAN information.

Figure 4:
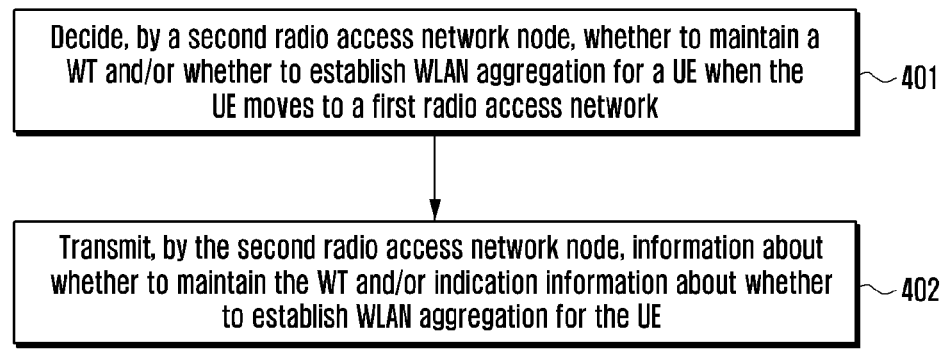
FIG. 4 is a schematic flowchart of a second method for enhancing WLAN aggregation mobility according to the present invention.

FIG. 4 is a schematic flowchart of a second method for enhancing WLAN aggregation mobility according to the present invention. This method comprises the following steps.

Step 401: By a second radio access network node, whether to maintain a WT and/or whether to establish WLAN aggregation for a UE is decided when the UE moves to a first radio access network.

In some implementations, the second radio aces network node acquires, from the UE, a WT, the second radio aces network node or a core network node, the WLAN information about the UE so as to decide whether to maintain the WT or whether to establish WLAN aggregation for the UE.

In some implementations, during preparing for handover or when a handover event occurs, for the established WLAN aggregation for the UE, the second radio access network node decides whether to maintain the WT or whether to establish WLAN aggregation for the UE when the UE moves to the first radio access network.

In a preferred implementation, the second radio access network node decides not to establish WLAN aggregation for the UE when one or more of the following conditions are satisfied. In some implementations, the second radio access network node sets the indication information about whether to establish WLAN aggregation for the UE as NO.

1) There is no WLAN node satisfying the conditions for WLAN aggregation for the UE.

2) The WLAN state of the UE is abnormal, for example, one or more of the following:

a) the information about abnormal connection of the UE to the WLAN is received;

b) the information about WLAN connection failure caused by a WLAN radio link issue is received;

c) the information about WLAN connection failure caused by an internal reason of the UE is received (for example, the UE closes the WLAN or selects another WLAN node due to the user's preference);

d) the information about WLAN connection failure caused by rejection from the WLAN is received;

e) the information about WLAN connection failure due to a timeout failure is received;

f) the received WLAN state information of the UE is the WLAN connection is abnormal; and g) the UE selects a WLAN node not belonging to the mobility set of the WLAN aggregation for the UE (for example, selects a WLAN node not belonging to the mobility set of the WLAN aggregation for the UE due to the user's preference), but the user's preferred WLAN node does not satisfy the requirements of WLAN aggregation.

In a preferred implementation, the second radio access network node decides to establish WLAN aggregation for the UE when one or more of the following conditions are satisfied. In some implementations, the second radio access network node sets the indication information about whether to establish WLAN aggregation for the UE as YES.

1) There is a WLAN node satisfying the conditions for WLAN aggregation for the UE.

2) The WLAN state of the UE is normal. For example, the received WLAN state information of the UE is that the connection of the UE to the WLAN is normal.

3) The received WLAN state information of the UE is that the connection of the UE to the WLAN is abnormal, but the connection of the UE to the WLAN can be restored to a normal state by updating the mobility set of the WLAN aggregation for the UE (the contents are as described in the step 301). For example, due to the user's preference, a WLAN node beyond the mobility set of the WLAN aggregation for the UE is selected, but the user's preferred WLAN node satisfies the requirements of WLAN aggregation. For example, the WLAN state is abnormal, and the WLAN node currently associated with the UE satisfies the requirements of the WLAN aggregation.

In a preferred implementation, the second radio access network node determines to maintain the mobility set for the WLAN aggregation for the UE when one or more of the following are satisfied.

1) An event of changing the mobility set of the WLAN aggregation for the UE does not occur. For example, one or more of the following conditions are satisfied:

a) The WLAN measurement report information of the UE is not received. In some implementations, the UE reports the WLAN measurement report information only when there is no WLAN node satisfying the threshold conditions for WLAN aggregation in the current mobility set of the WLAN aggregation for the UE. Therefore, when the WLAN measurement report information of the UE is not received, it is indicated that the mobility set of the WLAN aggregation for the UE may not be updated.

b) The current mobility set of the WLAN aggregation is still within a validity period.

2) The WLAN state of the UE is normal. For example, the received WLAN state information of the UE is that the connection of the UE to the WLAN is normal.

In a preferred implementation, the second radio access network node determines not to change a source WT node serving the UE when one or more of the following are satisfied.

1) The mobility set of the WLAN aggregation is decided not to be changed.

2) The mobility set of the WLAN aggregation is to be changed, but the changed mobility set of the WLAN aggregation is still within a management range of the source WT.

3) The WLAN state of the UE is normal. For example, the received WLAN state information of the UE is that the connection of the UE to the WLAN is normal.

In a preferred implementation, the mobility set of the WLAN aggregation for the UE, the indication information of the absence of WLAN node candidates for the WLAN aggregation for the UE, the WLAN measurement report information, the information about WLAN node candidates for the WLAN aggregation for the UE and the WLAN state information of the UE are all as described in the step 301 and will not be repeated here.

Step 402: By the second radio access network node, information about whether to maintain the WT and/or indication information about whether to establish WLAN aggregation for the UE is transmitted.

Specifically, the second radio access network node specifically transmit the information about whether to maintain the WT and/or the indication information about whether to establish WLAN aggregation for the UE to a first radio access network node, the UE, the WT or a core network node.

In some implementations, during preparing for handover or when a handover event occurs, upon deciding to maintain the WT, the second radio access network node transmits the decided information of maintaining the WT to the first radio access network node.

In a preferred implementation, the information of maintaining the WT contains one or more of the following: indication information of maintaining the WT and information about the WT for the WLAN aggregation for the UE. The specific content of the information about the WT for the WLAN aggregation for the UE is as described in the step 301 and will not be repeated here.

In a preferred implementation, the second radio access network node transmits the WLAN information about the UE to the first radio access network node. The WLAN information about the UE is as described in the step 301 and will not be repeated here. In some implementations, the transmitted configuration information about the WLAN aggregation for the UE is configuration information about the WLAN aggregation for the UE which is updated by the second radio access network node, for example, the mobility set of the WLAN aggregation for the UE which is updated according to the WLAN measurement report.

In some implementations, during preparing for handover or when a handover event occurs, the second radio access network node transmits the indication information about whether to establish WLAN aggregation for the UE to the first radio access network node.

In some implementations, the second radio access network node does not transmit the configuration information about the WLAN aggregation for the UE (the WLAN information about the UE is as described in the step 301) or the WLAN information about the UE (the WLAN information about the UE is as described in the step 301) to the first radio access network node, so it is indicated that it is unable to establish WLAN aggregation for the UE or the conditions for the WLAN aggregation for the UE are not satisfied. The first radio access network node can establish WLAN aggregation for the UE as required after the UE satisfies the conditions for WLAN aggregation again.

In some implementations, the indication information of maintaining the WT can represent at least one of the following: the WT reuses the existing UE context in the WT, and information in a WT addition request message (e.g., new WLAN aggregation security information) is ignored. The WT aggregation security information is as described in the step 301 and will not be repeated here.

Figure 5:
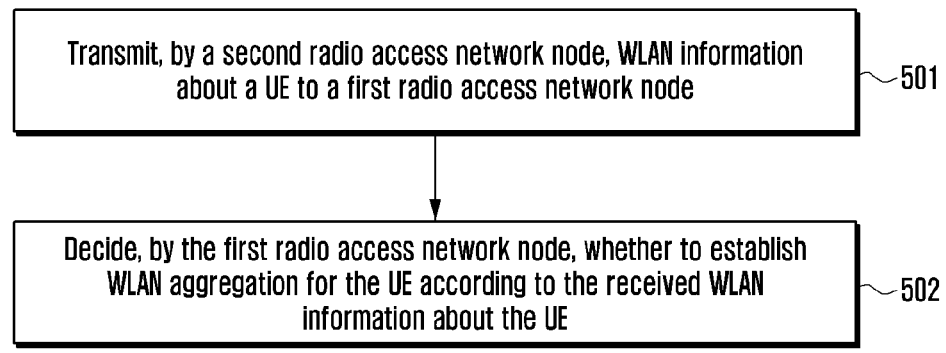
FIG. 5 is a schematic flowchart of a third method for enhancing WLAN aggregation mobility according to the present invention.

FIG. 5 is a schematic flowchart of a third method for enhancing WLAN aggregation mobility according to the present invention. This method comprises the following steps.

Step 501: WLAN information about a UE is transmitted to a first radio access network node by a second radio access network node.

In a preferred implementation, the WLAN information about the UE is as described in the step 301 and will not be repeated here.

In some implementations, during preparing for handover or when a handover occurs, although the WLAN aggregation for the UE is not established, the second radio access network node transmits one or more of the following information to the first radio access network node: WLAN measurement report information of the UE, information about WLAN node candidates for the WLAN aggregation for the UE, an identifier of the UE, WLAN state information of the UE, an identifier of a serving PLMN, information about a WLAN node currently associated with the UE, WLAN measurement configuration information, and the WLAN capability of the UE. The specific content of the information is as described in the step 301 and will not be repeated here.

Step 502: The first radio access network node decides whether to establish WLAN aggregation for the UE according to the received WLAN information about the UE.

In some implementations, during preparing for handover or when a handover occurs, the first radio access network node establishes, for a WT, WLAN aggregation for the UE and then returns handover request acknowledge to the second radio access network node.

Corresponding to the method shown in FIG. 4, the present invention further discloses a radio access network node, comprising:
a module configured to decide whether to maintain a WT and/or whether to establish WLAN aggregation for a UE when the UE moves to a first radio access network, and
a module configured to transmit information about whether to maintain the WT and/or indication information about whether to establish the WLAN aggregation for the UE.

Figure 6:
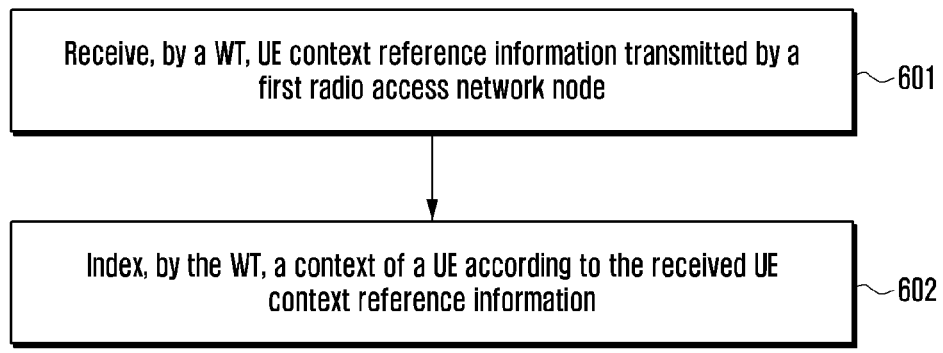
FIG. 6 is a schematic flowchart of a fourth method for enhancing WLAN aggregation mobility according to the present invention.

FIG. 6 is a schematic flowchart of a fourth method for enhancing WLAN aggregation mobility according to the present invention. This method comprises the following steps.

Step 601: By a WT, UE context reference information transmitted by a first radio access network node is received.

In some implementations, upon receiving a WLAN aggregation setup request from a UE, the WT receives UE context reference information transmitted by the first radio access network node. In some implementations, the UE context reference information is carried in a WT addition request message.

In a preferred embodiment, the UE context reference information comprises: a UE identifier, and indication information of maintaining a UE context in the WT. The content of the UE identifier is the same as that in the step 301 and will not be repeated here. The UE identifier can be used for two purposes. On one hand, during WLAN aggregation, the UE identifier is used by the WT to determine whether the UE is successfully associated with a WLAN node under the WT: and on the other hand, the UE identifier is used for indicating whether the WT has found the existing UE context. In an implementation, the UE identifier for two purposes refers to a same UE identifier (for example, the MAC address of the UE in the WLAN). In another implementation, the UE identifier for two purposes refers to two UE identifiers, respectively: a first UE identifier and a second UE identifier. For example, the first UE identifier (for example, the MAC address of the UE in the WLAN) is used by the WT to determine whether the UE is successfully associated with a WLAN node under the WT during the WLAN aggregation; and the second UE identifier (for example, WT UE Xw AP ID) is used for indicating whether the WT has found the existing UE context. Step 502: The WT prepares WLAN aggregation for the UE according to the first radio access network node.

In some implementations, the WT receives, in a WT release request message or a UE context release message, indication information of maintaining a UE context in the WT.

Step 602: By a WT, a UE context is indexed according to the received UE context reference information.

In some implementations, the WT indexes a UE context established in the WT according to the received UE identifier. For example, according to the received UE identifier, the WT indexes a UE context which is established in the WT by a second radio access network node.

In further implementations, the WT maintains the indexed UE context according to the indication information of maintaining the UE context in the WT.

In a preferred embodiment, after the WT has indexed the UE context, the WT further prepare the configuration information about WLAN aggregation for the UE and transmit it to the first radio access network node or the UE. In some implementations, when replying the WLAN aggregation setup response or the WT addition request acknowledge, the WT replies configuration information about the WLAN aggregation for the UE together. The configuration information about the WLAN aggregation for the UE is as described in the step 301. Upon receiving the configuration information about the WLAN aggregation for the UE, the first radio access network node forwards the configuration information to the UE via the second radio access network node or via the core network node.

In a preferred implementation, after the WT has indexed the UE context, the WT returns WT association confirmation indication information to the first radio access network node, so as to trigger the first radio access network node to immediately transmit UE data to the WT. In some implementations, the WT can contain the WT association confirmation indication information or a trigger WT association confirmation message in a WLAN aggregation setup response or the WT addition request acknowledge.

In a preferred implementation, when the WT has not indexed the existing UE context, the WT can create a UE context. At this time, the WT can execute at least one of the following: not returning the WT association confirmation indication information, returning WT-created UE context indication information, and returning an indication of update WLAN aggregation security information (for example, key Kwt). In some implementations, the first radio access network node can execute one of the following: transmitting the updated WLAN aggregation security information to the UE or the WT, when at least one of the following conditions is satisfied: no receipt of the WT association confirmation indication information, receipt of the indication information of creating a UE context and receipt of the indication of update WLAN aggregation security information. The first radio access network node can transmit the updated WLAN aggregation security information to the UE via the second radio access network node. Corresponding to the method shown in FIG. 6, the present invention further discloses a WT, specifically comprising:

a module configured to receive UE context reference information transmitted by a first radio access network node; and a module configured to index a UE context according to the received UE context reference information.

Figure 13:
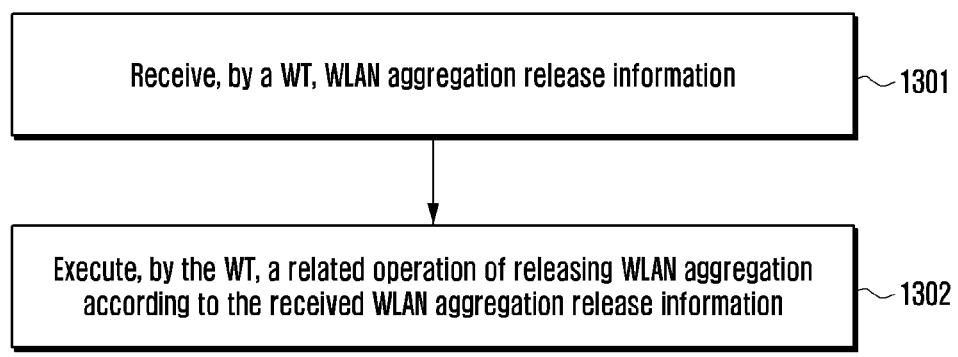
FIG. 13 is a schematic flowchart of a fifth method for enhancing WLAN aggregation mobility according to the present invention.

FIG. 13 is a schematic flowchart of a fifth method for enhancing WLAN aggregation mobility according to the present invention. This method comprises the following steps.

Step 1301: By a WT, WLAN aggregation release information is received.

Optionally, the WLAN aggregation release information can comprise at least one of the following: indication information of maintaining a UE context in the WT, indication information of maintaining a connection to a UE between the WT and a radio access network node, and indication information of stopping transmitting downlink data to a UE.

In some implementations, the WT can receive the WLAN aggregation release information from at least one of the following: a radio access network node, the UE and a core network.

Step 1302: By the WT, a related operation of releasing WLAN aggregation is executed according to the received WLAN aggregation release information.

In an implementation, upon receiving the WLAN aggregation release information from a radio access network node for the first time, the WT can execute at least one of the following: maintaining a UE context, maintaining a connection to the UE between the WT and a radio access network node, and stopping transmitting downlink data to the UE.

Upon receiving the WLAN aggregation release information from a radio access network node for the second time, the WT can execute at least one of the following: maintaining the UE context, and releasing the connection to the UE between the WT and the radio access network node.

In a preferred implementation, when the WLAN aggregation release information contains the indication information of maintaining a UE context in the WT, the WT can execute at least one of the following: maintaining the UE context, maintaining a connection to the UE between the WT and a radio access network node, and stopping transmitting downlink data to the UE.

In a preferred implementation, when the WLAN aggregation release information contains the indication information of maintaining a connection to the UE between the WT and a radio access network node, the WT can execute at least one of the following: maintaining the UE context, and maintaining the connection to the UE between the WT and the radio access network node.

In a preferred implementation, when the WLAN aggregation release information contains the indication information of releasing a connection to the UE between the WT and a radio access network node, the WT can execute at least one of the following: maintaining the UE context, and releasing the connection to the UE between the WT and the radio access network node.

During the handover process, it is necessary to update a security uplink text between the UE and a base station, so the data transmission will be interrupted; and if it is able to continue to perform transmission between the UE and the WT, the throughput of the UE can be maintained during the handover. By this method, when handover starts, the WT can stop transmitting data encrypted by an old key to the UE, so radio resources are avoided from being occupied by too much invalid data. On the other hand, the connection to the UE between the WT and a source radio access network node is maintained to continuously transmit the uplink data. After the handover ends, the connection to the UE between the WT and the source radio access network node is released. In this process, the existing UE context in the WT is reused, and is not required to be released.

Corresponding to the method shown in FIG. 13, the present invention further discloses a WT, specifically comprising:

a module configured to receive WLAN aggregation release information; and a module configured to release WLAN aggregation according to the received WLAN aggregation release information.

Figure 14:
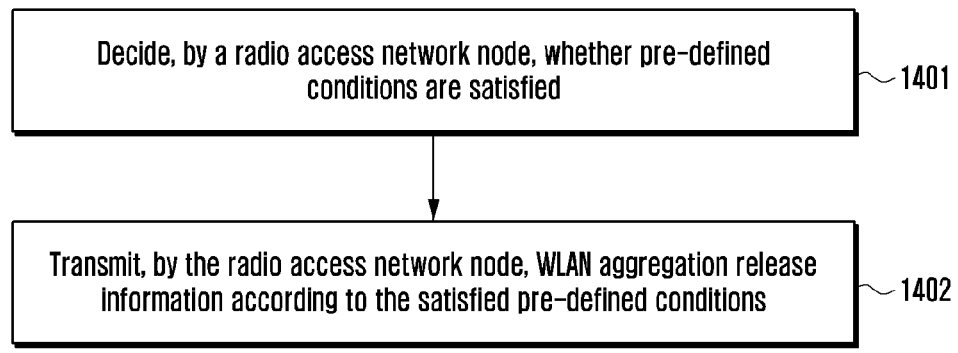
FIG. 14 is a schematic flowchart of a sixth method for enhancing WLAN aggregation mobility according to the present invention.

FIG. 14 is a schematic flowchart of a sixth method for enhancing WLAN aggregation mobility according to the present invention. This method comprises the following steps.

Step 1401: By a radio access network node, whether pre-defined conditions are satisfied is decided.

Optionally, the pre-defined conditions can comprise at least one of the following: receipt of indication information of maintaining a UE context in a WT, aware of handover start, receipt of handover request acknowledge, aware of handover completion, and receipt of a UE context release request. The indication information of maintaining the UE context in the WT is as described in the step 601 and will not be repeated here.

Step 1402: By the radio access network node, WLAN aggregation release information is transmitted according to the satisfied pre-defined conditions.

Optionally, the contents contained in the WLAN aggregation release information are as described in the step 1301 and will not be repeated here.

In some implementations, the radio access network node at least transmits the WLAN aggregation release information to one of the following: a radio access network node, a UE and a core network.

When at least one of the following pre-defined conditions is satisfied: receipt of indication information of maintaining a UE context in a WT, aware of handover start and receipt of handover request acknowledge, the radio access network node can execute at least one of the following:

transmitting the WLAN aggregation release information;

transmitting a WLAN aggregation release request message for the first time, and transmitting the WLAN aggregation release information, and the WLAN aggregation release information at least contain one of the following: 1) indication information of maintaining a connection to the UE between the WT and the radio access network node; 2) indication information of maintaining a UE context in the WT; and, 3) stopping transmitting downlink data to the UE.

When at least one of the following pre-defined conditions is satisfied: receipt of indication information of maintaining a UE context in a WT, aware of handover completion and receipt of a UE context release request, the radio access network node can execute at least one of the following:

transmitting a WLAN aggregation release request message for the second time;

transmitting the WLAN aggregation release information; and transmitting the WLAN aggregation release information, and the WLAN aggregation release information at least contain one of the following: 1) indication information of releasing a connection to the UE between the WT and the radio access network node; and, 2) indication information maintaining a UE context in the WT.

During the handover, it is necessary to update a security uplink text between the UE and a base station, so the data transmission will be interrupted; and if it is able to continue to perform transmission between the UE and the WT, the throughput of the UE can be maintained during the handover. By this method, when handover starts, the WT can stop transmitting data encrypted by an old key to the UE, so radio resources are avoided from being occupied by too much invalid data. On the other hand, the connection to the UE between the WT and a source radio access network node is maintained to continuously transmit the uplink data. After the handover ends, the connection to the UE between the WT and the source radio access network node is released. In this process, the existing UE context in the WT is reused, and is required not to be released.

Corresponding to the method shown in FIG. 14, the present invention further discloses a radio access network node, specifically comprising:

a module configured to decide whether pre-defined conditions are satisfied to receive WLAN aggregation release information; and a module configured to transmit the WLAN aggregation release information according to the satisfied pre-defined conditions.

Embodiments of the method for enhancing WLAN aggregation mobility provided by the preset invention in different mobility scenarios will be described below according to different actual mobility scenarios of a user equipment.

Embodiment 1

Figure 7:
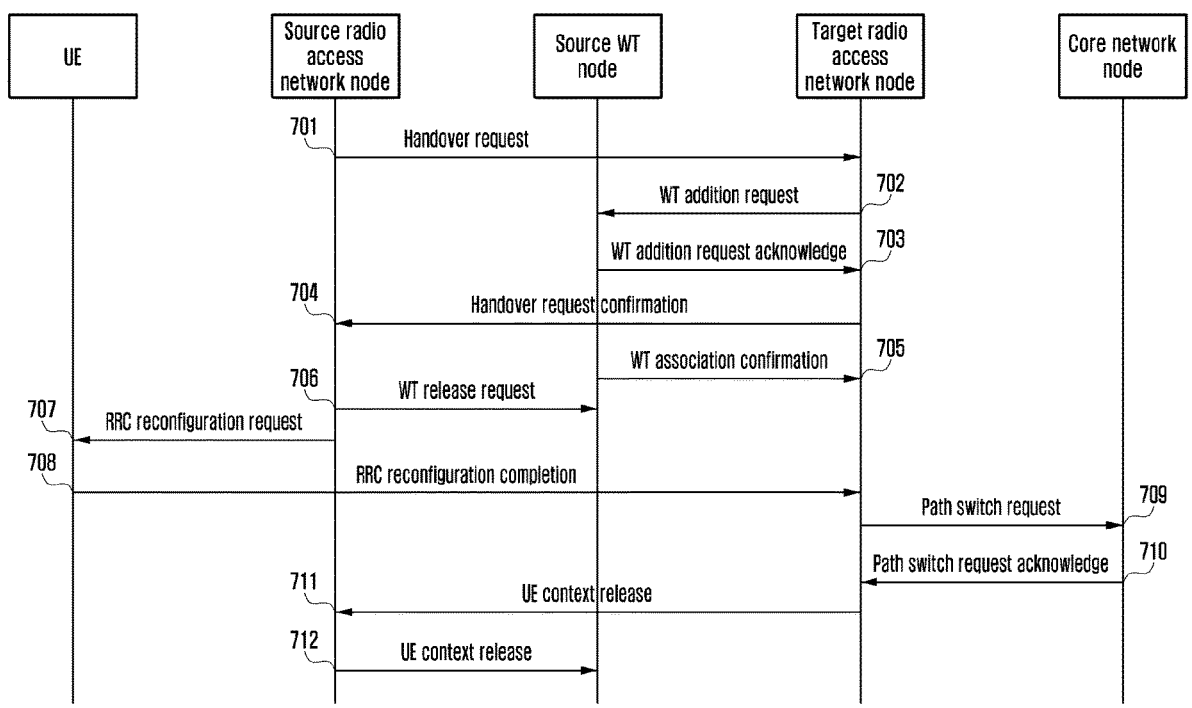
FIG. 7 is a schematic flowchart of Embodiment 1 of the method for enhancing WLAN aggregation mobility according to the present invention.

FIG. 7 is a schematic diagram of Embodiment 1 of the method for enhancing WLAN aggregation mobility according to the present invention. The scenario is that a target radio access network node determines not to change a WT node for WLAN aggregation for a UE according to the WLAN information about the UE, which is received from a source radio access network node, when the UE is handed over between radio access network nodes (e.g., X2 handover). In Embodiment 1, the target radio access network node is the first radio access network node described above, and the source radio access network node is the second radio access network node described above.

As shown in FIG. 7, the method comprises the following steps.

Step 701: A handover request message is transmitted to a target radio access network node by a source radio access network node.

In a preferred implementation, the handover request message contains WLAN information about a UE (the WLAN information about the UE is as described in the step 301). The target radio access network node can determine a WT node for WLAN aggregation for the UE according to the received WLAN information about the UE. The specific operation is as described in the step 302.

Step 702: When it is determined to maintain a source WT, the target radio access network node transmits a WT addition request message to the source WT.

In a preferred implementation, the WT addition request message contains UE context reference information (as described in the step 601). According to the received UE context reference information, the WT finds a UE context established in the WT by the source radio access network. The specific operation is as described in the step 602 and will not be repeated here.

Step 703: A WT addition request acknowledge message is transmitted to the target radio access network node by the source WT node.

In a preferred implementation, this message contains a configuration for the WLAN aggregation for the UE (as described in the step 602), for example, a mapping result of the 3GPP QoS (e.g., QCI, ARP, MBR, GBR or more) of a UE bearer and the QoS of a WLAN (e.g., access category or priority). In some implementations, the UE can bear uplink data transmission of a WLAN aggregation bearer decided by the mapped access category. Generally, different categories have different back-off times during a resource collision.

In a preferred implementation, this message contains WT association confirmation indication information, or a WT association confirmation message transmitted by a subsequent source WT to the target access network node subsequently.

Step 704: A handover request acknowledge message is returned to the source radio access network node by the target radio access network node.

In a preferred implementation, the handover request acknowledge message contains configuration information about the WALN aggregation for the UE (as described in the step 301), and indication information of maintaining a UE context in the WT (as described in the step 601). In some implementations, the configuration information about the WALN aggregation for the UE further contains a mapping result of the 3GPP QoS (e.g., QCI, ARP, MBR, GBR or more) of a UE bearer and the QoS of a WLAN.

Step 705: In a preferred implementation, the WT returns a WT association confirmation to the target radio access network node.

Step 706: In a preferred implementation, the source radio access network node transmits a WT release request message to the WT. In a preferred implementation, when the message contains indication information of maintaining a UE context in the WT, the WT executes at least one of the following according to the received indication information of maintaining a UE context in the WT: maintaining the UE context, maintaining a connection to the UE between the WT and a radio access network node, and stopping transmitting downlink data to the UE.

Optionally, when the WT release request message contains indication information of maintaining a connection to the UE between the WT and a radio access network node, the WT executes at least one of the following according to the received indication information of maintaining a connection to the UE between the WT and a radio access network node: maintaining the UE context, and maintaining the connection to the UE between the WT and the radio access network node.

Step 707: An RRC reconfiguration request message is transmitted to the UE by the source radio access network node. In a preferred implementation, this message contains configuration information about the WLAN aggregation for the UE, for trigging the UE to adopt new WLAN aggregation configuration information.

Step 708: An RRC reconfiguration completion message is returned to the target radio access network node by the UE. The new WLAN aggregation configuration information adopted by the UE is carried in this message.

Step 709: A path switch request is transmitted to a core network node by the target radio access network node.

Step 710: A path conversion acknowledge is transmitted to the target radio access network node by the core network node.

Step 711: A UE context release message is transmitted to a radio access network node by the target radio access network node.

Step 712: In a preferred implementation, the source radio access network node transmits a UE context release message or a WT release request message to the WT. In a preferred implementation, when the message contains indication information of maintaining a UE context in the WT, the WT executes at least one of the following according to the received indication information of maintaining a UE context in the WT: maintaining the UE context, and releasing a connection to the UE between the WT and a radio access network node.

Optionally, when the WT release request message contains indication information of releasing a connection to the UE between the WT and a radio access network node, the WT executes at least one of the following according to the received indication information of releasing a connection to the UE between the WT and a radio access network node: maintaining the UE context, and releasing the connection to the UE between the WT and the radio access network node.

Now, the method flow in Embodiment 1 ends.

Embodiment 2

Figure 8:
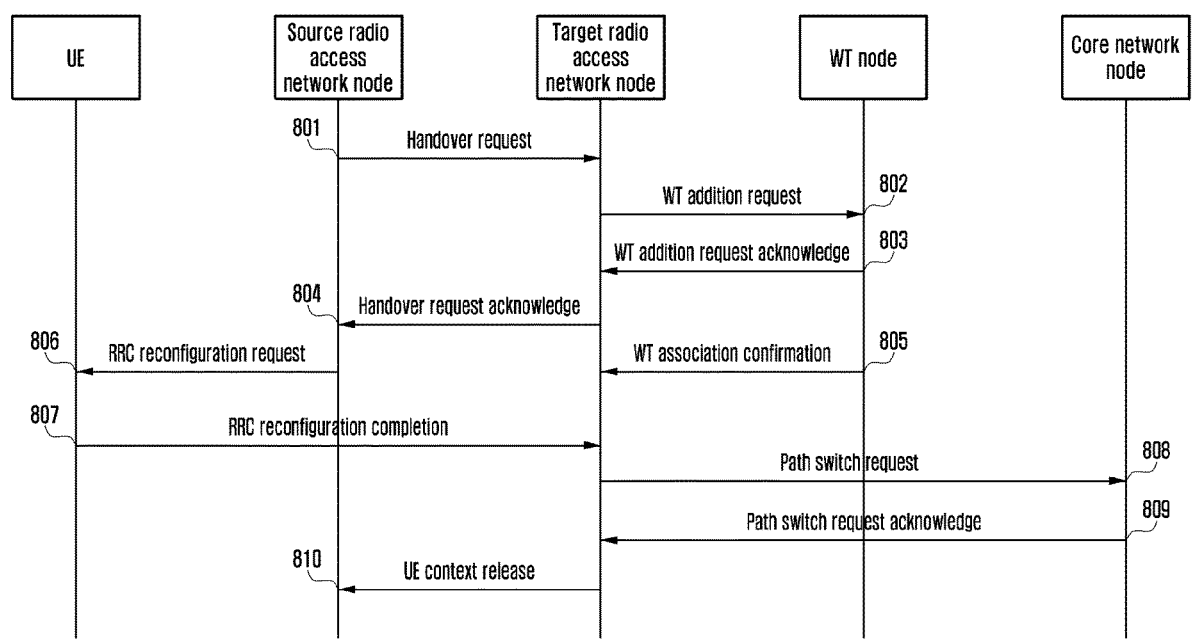
FIG. 8 is a schematic flowchart of Embodiment 2 of the method for enhancing WLAN aggregation mobility according to the present invention.

FIG. 8 is a schematic diagram of Embodiment 2 of the method for enhancing WLAN aggregation mobility according to the present invention. The scenario is that a target radio access network node determines to create WLAN aggregation for a UE according to the WLAN information about the UE, which is received from a source radio access network node, when the UE is handed over between radio access network nodes (e.g., X2 handover). In Embodiment 2, the target radio access network node is the first radio access network node described above, and the source radio access network node is the second radio access network node described above.

As shown in FIG. 8, the method comprises the following steps.

Step 801: A handover request message is transmitted to a target radio access network node by a source radio access network node.

In a preferred implementation, the handover request message contains WLAN information about a UE (as described in the step 301). The target radio access network node can determine a WT node for creating WLAN aggregation for the UE according to the received WLAN information about the UE. The specific operation is as described in the step 302.

Step 802: When it is determined to establish WLAN aggregation for a UE, the target radio access network node transmits a WT addition request message to the selected WT node.

Step 803: The WT addition request acknowledge message is transmitted to the target radio access network node by the WT node.

In a preferred implementation, this message contains a configuration for the WLAN aggregation for the UE (as described in the step 602), for example, a mapping result of the 3GPP QoS (e.g., QCI, ARP, MBR, GBR or more) of a UE bearer and the QoS of a WLAN (e.g., access category or priority). In some implementations, the UE can bear uplink data transmission of a WLAN aggregation bearer decided by the mapped access category. Generally, different categories have different back-off times during a resource collision.

In a preferred implementation, this message contains WT association confirmation indication information, or a WT association confirmation message transmitted by the WT to the target access network node subsequently.

Step 805: A handover request acknowledge message is returned to the source radio access network node by the target radio access network node.

In a preferred implementation, the handover request acknowledge message contains configuration information about the WALN aggregation for the UE (as described in the step 301), and indication information of maintaining a UE context in the WT. In some implementations, the configuration information about the WALN aggregation for the UE further contains a mapping result of the 3GPP QoS (e.g., QCI, ARP, MBR, GBR or more) of a UE bearer and the QoS of a WLAN.

Step 806: An RRC reconfiguration request is transmitted to the UE by the source radio access network node. In a preferred implementation, this message contains configuration information about the WLAN aggregation for the UE, for trigging the UE to adopt new WLAN aggregation configuration information.

Step 807: An RRC reconfiguration completion message is returned to the target radio access network node by the UE.

Step 808: A path switch request message is transmitted to a core network node by the target radio access network node.

Step 809: A path switch request acknowledge message is transmitted to the target radio access network node by the core network node.

Step 810: A UE context release message is transmitted to a radio access network node by the target radio access network node.

Now, the method flow in this embodiment ends.

Embodiment 3

Figure 9:
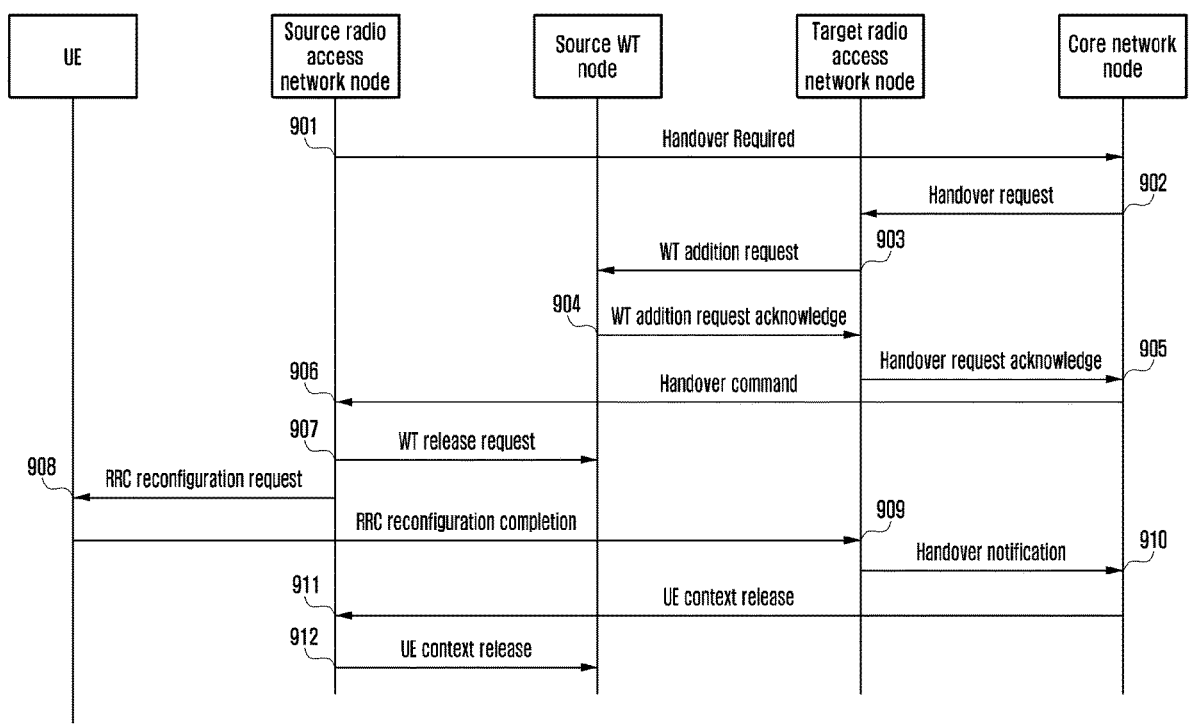
FIG. 9 is a schematic flowchart of Embodiment 3 of the method for enhancing WLAN aggregation mobility according to the present invention.

FIG. 9 is a schematic diagram of Embodiment 3 of the method for enhancing WLAN aggregation mobility according to the present invention. The scenario is that a target radio access network node determines not to change a WT node for WLAN aggregation for a UE according to the WLAN information about the UE, which is received from a source radio access network node, when the UE is handed over between radio access network nodes through a core network node (e.g., S1 handover). In Embodiment 3, the target radio access network node is the first radio access network node described above, and the source radio access network node is the second radio access network node described above.

As shown in FIG. 9, the method comprises the following steps.

Step 901: A handover required message is transmitted to a core network node by a source radio access network node. In a preferred implementation, the handover required message contains WLAN information about a UE (as described in the step 301).

Step 902: A handover request is transmitted to a target radio access network node by the core network node. In a preferred implementation, the handover request message contains the WLAN information about the UE (the WLAN information about the UE is as described in the step 301). The target radio access network node can determine a WT node for WLAN aggregation for the UE according to the received WLAN information about the UE. The specific operation is as described in the step 302.

Steps 903 to 904 are the same as the steps 702 to 703 and will not be repeated here.

Step 905: A handover request acknowledge message is transmitted to the core network node by the target radio access network node.

In a preferred implementation, the handover request acknowledge message contains configuration information about the WALN aggregation for the UE (as described in the step 301), and indication information of maintaining a UE context in the WT. In some implementations, the configuration information about the WALN aggregation for the UE further contains a mapping result of the 3GPP QoS (e.g., QCI, ARP, MBR, GBR or more) of a UE bearer and the QoS of a WLAN.

Step 906: A handover command is transmitted to the source radio access network node by the core network node. In a preferred implementation, the handover command message contains configuration information about the WALN aggregation for the UE (as described in the step 301), and indication information of maintaining a UE context in the WT. In some implementations, the configuration information about the WALN aggregation for the UE further contains a mapping result of the 3GPP QoS (e.g., QCI, ARP, MBR, GBR or more) of a UE bearer and the QoS of a WLAN.

Steps 907 to 909 are consistent with the steps 706 to 708 and will not be repeated here.

Step 910: A handover notification is transmitted to the core network node by the target radio access network node.

Step 911: A UE context release message is transmitted to the source radio access network node by the core network node.

Step 912 is consistent with the step 712 and will not be repeated here.

Now, the method flow in this embodiment ends.

Embodiment 4

Figure 10:
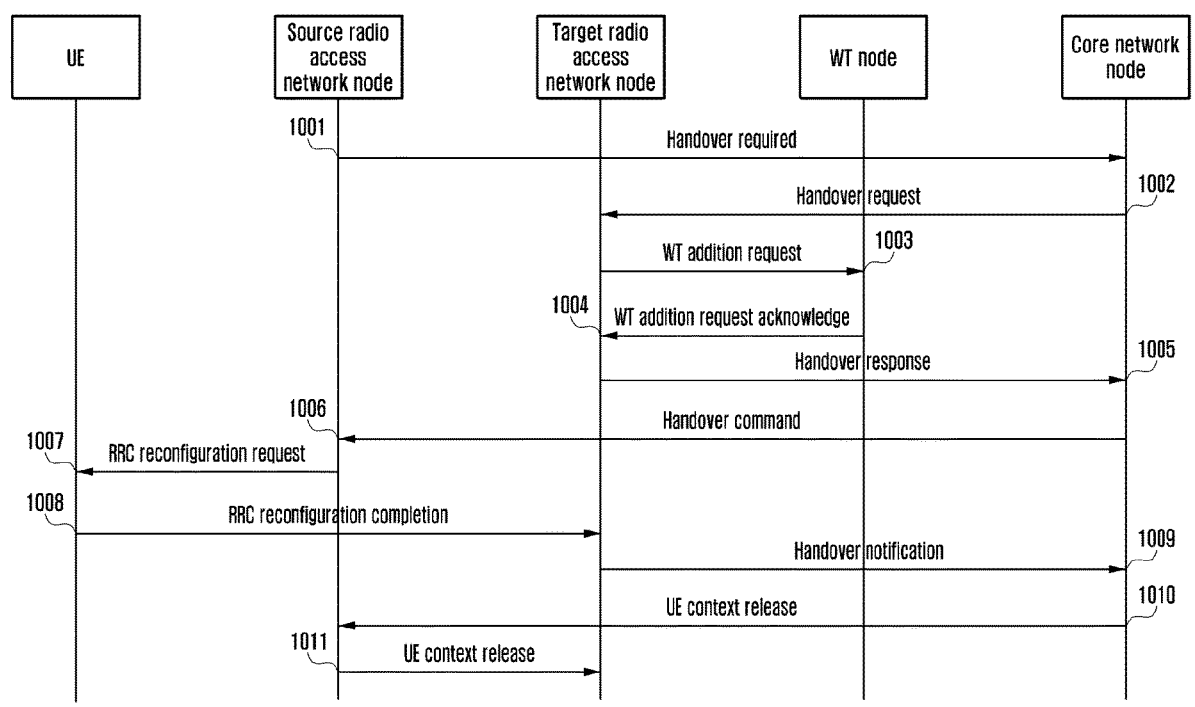
FIG. 10 is a schematic flowchart of Embodiment 4 of the method for enhancing WLAN aggregation mobility according to the present invention.

FIG. 10 is a schematic diagram of Embodiment 4 of the method for enhancing WLAN aggregation mobility according to the present invention. The scenario is that a target radio access network node determines to create WLAN aggregation for a UE according to the WLAN information about the UE, which is received from a source radio access network node, when the UE is handed over between radio access network nodes through a core network node (e.g., S1 handover). In Embodiment 4, the target radio access network node is the first radio access network node described above, and the source radio access network node is the second radio access network node described above.

As shown in FIG. 10, the method comprises the following steps.

Step 1001: A handover required message is transmitted to a core network node by a source radio access network node. In a preferred implementation, the handover required message contains WLAN information about a UE (as described in the step 301).

Step 1002: A handover request is transmitted to a target radio access network node by the core network node. In a preferred implementation, the handover request message contains the WLAN information about the UE (the WLAN information about the UE is as described in the step 301). The target radio access network node can determine a WT node for WLAN aggregation for the UE according to the received WLAN information about the UE. The specific operation is as described in the step 302.

Steps 1003 to 1004 are the same as the steps 802 to 803 and will not be repeated here.

Step 1005: A handover request acknowledge message is transmitted to the core network node by the target radio access network node.

In a preferred implementation, the handover request acknowledge message contains configuration information about the WALN aggregation for the UE (as described in the step 301), and indication information of maintaining a UE context in the WT. In some implementations, the configuration information about the WALN aggregation for the UE further contains a mapping result of the 3GPP QoS (e.g., QCI, ARP, MBR, GBR or more) of a UE bearer and the QoS of a WLAN.

Step 1006: A handover command is transmitted to the source radio access network node by the core network node.

In a preferred implementation, the handover command message contains configuration information about the WLAN aggregation for the UE (as described in the step 301), and indication information of maintaining a UE context in the WT. In some implementations, the configuration information about the WALN aggregation for the UE further contains a mapping result of the 3GPP QoS (e.g., QCI, ARP, MBR, GBR or more) of a UE bearer and the QoS of a WLAN.

Steps 1007 to 1008 are consistent with the steps 806 to 807 and will not be repeated here.

Step 1009: A handover notification is transmitted to the core network node by the target radio access network node.

Step 1010: A UE context release message is transmitted to the source radio access network node by the core network node.

Step 1011: A UE context release message is transmitted to a radio access network node by the target radio access network node.

Now, the method flow in this embodiment ends.

Embodiment 5

Figure 11:
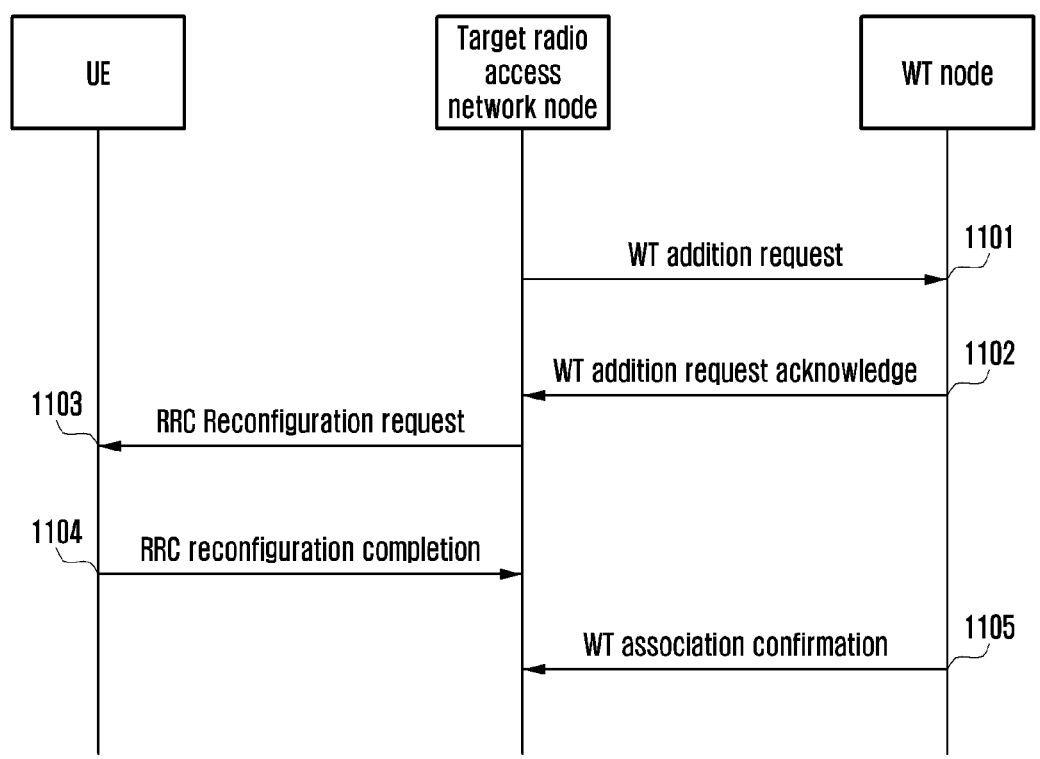
FIG. 11 is a schematic flowchart of Embodiment 5 of the method for enhancing WLAN aggregation mobility according to the present invention.

FIG. 11 is a schematic diagram of Embodiment 5 of the method for enhancing WLAN aggregation mobility according to the present invention. The scenario is that a radio access network node creates WLAN aggregation for a UE. In Embodiment 5, the target radio access network node is the first radio access network node described above, and the source radio access network node is the second radio access network node described above.

As shown in FIG. 11, the method comprises the following steps.

Step 1101: When it is determined to establish WLAN aggregation for a UE, a target radio access network node transmits a WT addition request message to a selected WT node.

Step 1102: A WT addition request acknowledge message is transmitted to the target radio access network node by the WT node.

In a preferred implementation, this message contains a configuration for the WLAN aggregation for the UE (as described in the step 602), for example, a mapping result of the 3GPP QoS (e.g., QCI, ARP, MBR, GBR or more) of a UE bearer and the QoS of a WLAN (e.g., access category or priority). In some implementations, the UE can bear uplink data transmission of a WLAN aggregation bearer decided by the mapped access category. Generally, different categories have different back-off times during a resource collision.

Step 1103: An RRC reconfiguration request is transmitted to the UE by a radio access network node. In a preferred implementation, this message contains configuration information about the WLAN aggregation for the UE, for trigging the UE to adopt new WLAN aggregation configuration information.

Step 1104: An RRC reconfiguration completion message is returned to the radio access network node by the UE.

Step 1105: After an association of the UE with a WLAN is established, the WT returns a WT association confirmation message to the radio access network node.

Embodiment 6

Figure 12:
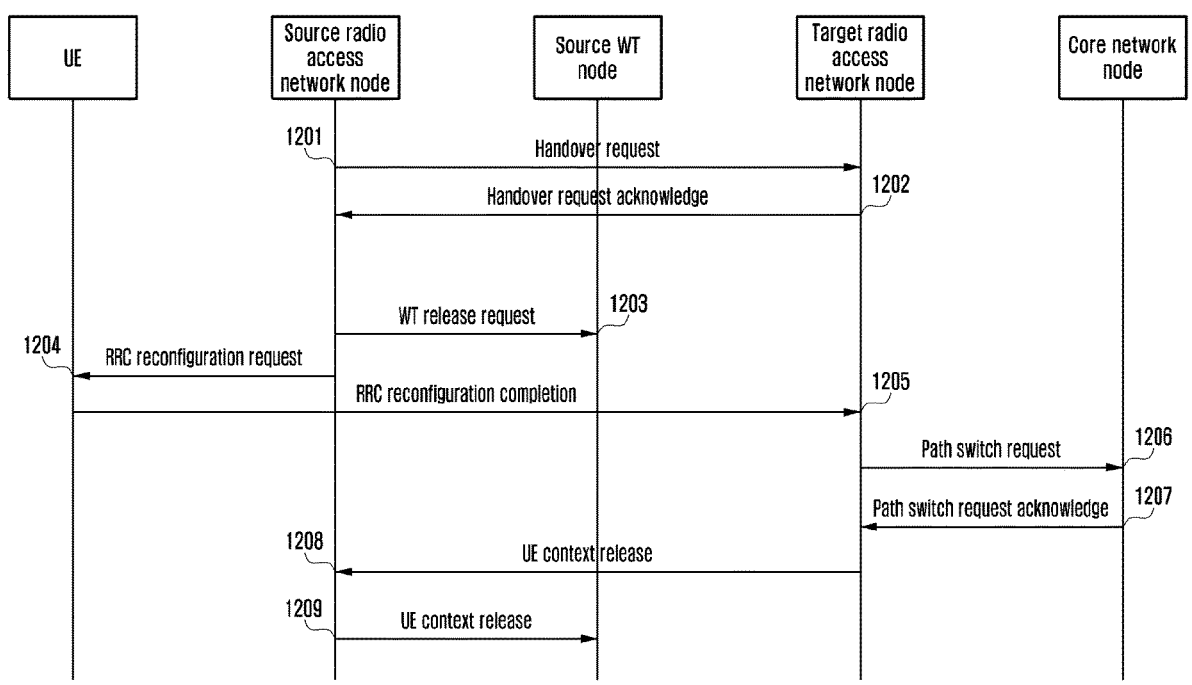
FIG. 12 is a schematic flowchart of Embodiment 6 of the method for enhancing WLAN aggregation mobility according to the present invention.

FIG. 12 is a schematic diagram of Embodiment 6 of the method for enhancing WLAN aggregation mobility according to the present invention. The scenario is that a target radio access network node determines not to immediately create WLAN aggregation for a UE according to the WLAN information about the UE, which is received from a source radio access network node, when the UE is handed over between radio access network nodes (e.g., X2 handover). In Embodiment 6, the target radio access network node is the first radio access network node described above, and the source radio access network node is the second radio access network node described above.

In Embodiment 6, the target radio access network node is the first radio access network node described above, and the source radio access network node is the second radio access network node described above.

As shown in FIG. 12, the method comprises the following steps.

Step 1201: A handover request message is transmitted to a target radio access network node by a source radio access network node.

In a preferred implementation, the handover request message contains WLAN information about a UE (the WLAN information about the UE is as described in the step 301). The target radio access network node can determine a WT node for WLAN aggregation for the UE according to the received WLAN information about the UE. The specific operation is as described in the step 302. In some implementations, if the WLAN information about the UE is indicative of not establishing WLAN aggregation for the UE immediately, the target radio access network node will not establish WLAN aggregation for the UE.

Step 1202: After the handover configuration is prepared, a handover request acknowledge message is returned to the source radio access network node by the target radio access network node.

Step 1203: In a preferred implementation, the source radio access network node transmits a WT release request message to a WT. In some implementations, the WT releases a UE context upon receiving this message.

Step 1204: An RRC reconfiguration request message is transmitted to the UE by the source radio access network node.

Step 1205: An RRC reconfiguration completion message is returned to the target radio access network node by the UE.

Step 1206: A path switch request is transmitted to a core network node by the target radio access network node.

Step 1207: A path switch request acknowledge message is transmitted to the target radio access network node by the core network node.

Step 1208: A UE context release message is transmitted to a radio access network node by the target radio access network node.

Step 1209: In a preferred implementation, the source radio access network node transmits a UE context release message or a WT release request message to the WT. In some implementations, the WT releases the UE context upon receiving this message.

Now, the method flow in Embodiment 6 ends.

It can be seen from the technical solutions that, WLAN information about a UE is acquired by the interoperation of a radio access network and a WT, and the process of establishing WLAN aggregation is optimized in a UE mobility scenario, so that the signaling overhead is reduced, and the continuity of data and the high data transmission rate are maintained. Accordingly, the WLAN aggregation performance in the UE mobility scenario is enhanced, and the user experience is further improved.

The forgoing description merely shows preferred embodiments of the present invention and is not intended to limit the present invention. Any modification, equivalent replacement or improvement made within the spirit and principle of the present invention shall fall into the protection scope of the present invention.

What is claimed is:

1. A method performed by a first radio access network (RAN) node for controlling a wireless local area network (WLAN) aggregation, wherein the WLAN aggregation is to establish a dual connection of an evolved-universal terrestrial radio access network (E-UTRAN) bearer and a WLAN bearer for a terminal, the method comprising:
receiving, from a second RAN node, a message for requesting a handover from the second RAN node to the first RAN node, wherein the message includes configuration information on the WLAN aggregation for the terminal associated with an E-UTRAN bearer for the second RAN node and an identifier of the terminal uniquely identifying the terminal on an Xw interface, wherein the identifier is assigned by a WLAN termination (WT);
transmitting, to the WT, a WT addition request message including the identifier that was previously assigned by the WT as a reference for a user equipment (UE) context, wherein the identifier is used by the WT to check whether the UE context is present; and receiving, from the WT, a WT addition request acknowledge message as a response to the WT addition request message,
wherein the configuration information includes a WT counter associated with a security for the WLAN aggregation.

2. The method of claim 1, wherein the configuration information includes a mobility set of the WLAN aggregation for the terminal.

3. The method of claim 2, wherein the mobility set of the WLAN aggregation for the terminal includes a group of deleted WLAN identifier or a group of added WLAN identifiers.

4. The method of claim 1, wherein the message further includes WLAN measurement report information.

5. The method of claim 1, wherein the message further includes information on WLAN capability of the terminal.

6. The method of claim 1, wherein the message further includes information on a WT node for the WLAN aggregation for the terminal,
wherein the information on the WT node includes an identifier of the WT node.

7. A first radio access network (RAN) node for controlling wireless local area network (WLAN) aggregation, wherein the WLAN aggregation is to establish a dual connection of evolved-universal terrestrial radio access network (E-UTRAN) bearer and a WLAN bearer for a terminal, comprising:
a receiving module configured to receive, from a second RAN node, a message for requesting a handover from the second RAN node to the first RAN node, wherein the message includes configuration information on the WLAN aggregation for the terminal associated with an E-UTRAN bearer for the second RAN node and an identifier of the terminal uniquely identifying the terminal on an Xw interface, wherein the identifier is assigned by a WLAN termination (WT);
a module configured to transmit, to the WT, a WT addition request message including the identifier that was previously assigned by the WT as a reference for a user equipment (UE) context, wherein the identifier is used by the WT to check whether the UE context is present; and
the receiving module configured to receive, from the WT, a WT addition request acknowledge message as a response to the WT addition request message,
wherein the configuration information includes a WT counter associated with a security for the WLAN aggregation.

8. The first RAN node of claim 7, wherein the configuration information includes a mobility set of the WLAN aggregation for the terminal.

9. The first RAN node of claim 8, wherein the mobility set of the WLAN aggregation for the terminal includes a group of deleted WLAN identifier or a group of added WLAN identifiers.

10. The first RAN node of claim 7, wherein the message further includes WLAN measurement report information.

11. The first RAN node of claim 7, wherein the message further includes information on WLAN capability of the terminal.

12. The first RAN node of claim 7, wherein the message further includes information on a WT node for the WLAN aggregation for the terminal, wherein the information on the WT node includes an identifier of the WT node.

* * * * *